United States Patent
Toyota et al.

(10) Patent No.: US 7,458,650 B2
(45) Date of Patent: Dec. 2, 2008

(54) REGENERATIVE BRAKING SYSTEM FOR MOTOR VEHICLES

(75) Inventors: Hiromitsu Toyota, Yamato (JP); Masaru Konishi, Zama (JP); Tomonaga Sugimoto, Fujisawa (JP); Yoichi Isono, Tochigi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 355 days.

(21) Appl. No.: 11/221,681

(22) Filed: Sep. 9, 2005

(65) Prior Publication Data
US 2006/0055240 A1   Mar. 16, 2006

(30) Foreign Application Priority Data
Sep. 10, 2004   (JP)   ............................. 2004-264059

(51) Int. Cl.
*B60T 8/64*   (2006.01)
(52) U.S. Cl. .................. 303/151; 303/147; 303/169
(58) Field of Classification Search .............. 303/152, 303/169, 140, 146, 147, 148, 171, 172, 173, 303/151
See application file for complete search history.

(56) References Cited

U.S. PATENT DOCUMENTS

| | | | | |
|---|---|---|---|---|
| 5,539,641 A | * | 7/1996 | Littlejohn | .................. 303/152 |
| 6,070,953 A | * | 6/2000 | Miyago | ....................... 303/152 |
| 6,273,529 B1 | * | 8/2001 | Woywod et al. | ............ 303/173 |
| 2006/0196712 A1 | * | 9/2006 | Toyota et al. | ................ 180/165 |

FOREIGN PATENT DOCUMENTS

| | | |
|---|---|---|
| JP | 05-161209 A | 6/1993 |
| JP | 07-223520 A | 8/1995 |
| JP | 2000-050409 A | 2/2000 |
| JP | 2000-270409 A | 9/2000 |

* cited by examiner

*Primary Examiner*—Thomas J Williams
(74) *Attorney, Agent, or Firm*—Foley & Lardner LLP

(57) ABSTRACT

A regenerative braking system has a generator connected to at least one wheel set to apply regenerative brake torque to it by generating electricity, a regenerative braking control means controlling a regenerative braking amount, an actual wheel speed variation calculating means calculating an actual wheel speed variation between actual outer-wheel speed of an outer wheel of steerable wheels and actual inner-wheel speed of at least one wheel of front and rear wheel sets, a correspondent wheel speed variation calculating means calculating a correspondent wheel speed variation corresponding to an outer-to-inner wheel speed variation of the steerable wheels with road grip, a steer characteristic judging means judging strength of a steer characteristic based on the correspondent wheel speed variation and the actual wheel speed variation, and a regenerative braking amount compensating means compensating the amount to be more decreased as the steer characteristic becomes stronger.

11 Claims, 22 Drawing Sheets

REGENERATIVE BRAKING SYSTEM FOR MOTOR VEHICLES

BACKGROUND OF THE INVENTION

1. Field of the Invention

A regenerating braking system for motor vehicles controls regenerative brake torque acting on wheels so as to improve fuel efficiency and ensure stability and controllability of a vehicle. Such a regenerative braking system is disclosed in Japanese patent laid-open publication Nos. 2000-050409, 2000-270409, and (Tokkaihei) 05-161209.

2. Description of the Related Art

A regenerating braking system for motor vehicles controls regenerative brake torque acting on wheels based on a so as to improve fuel efficiency and ensure stability and controllability of a vehicle. Such a regenerative braking system is disclosed in Japanese patents laid-open publication Nos. 2000-050409, 2000-270409, and (Tokkaihei) 05-161209.

Japanese patent laid-open publication No. 2000-050409 discloses a regenerative braking system (a first conventional system) having an electric generator connected with front wheels. This first system is capable of applying regenerative brake torque to the front wheels in addition to brake torque due to master cylinder fluid pressure, but prohibits the generator from applying the regenerative brake torque under the condition that estimated vehicle body speed is a predetermined-value larger than the maximum wheel speed between front left wheel speed and front right wheel speed. Under this condition, the brake torque applied to the wheels is obtained only by brake fluid pressure, not by the generator, for avoiding excessive understeer to ensure stability and controllability of a vehicle.

Japanese patent laid-open publication No. 2000-270409 discloses a regenerative braking system (a second conventional system) having an electric generator connected with rear wheels. This second system is capable of applying regenerative brake torque to the rear wheels in addition to brake torque caused by master cylinder fluid pressure, and also shifting regenerative braking control modes of the generator from a normal-road control mode to a low-friction road control mode when a low-friction road is detected. By this mode shift, the regenerative brake torque is reduced for avoiding excessive oversteer to ensure stability and controllability of a vehicle.

Japanese patent laid-open publication No. (Tokkaihei) 05-161209 discloses a regenerative braking system (a third conventional system) having an electric generator connected with rear wheels. This third system is capable of applying regenerative brake torque to the rear wheels in addition to brake torque caused by master cylinder fluid pressure, and also shifting regenerative braking control modes from a regenerative-braking priority control mode to a normal control mode when a steering angle exceeds a predetermined angle and vehicle speed exceeds predetermined speed. By this mode shift, application of the regenerative brake torque is prohibited and only brake torque due to master cylinder fluid pressure is applied under obtaining an ideal brake force distribution onto front wheels and rear wheels for avoiding excessive oversteer to ensure stability and controllability of a vehicle.

The above known conventional regenerative braking systems, however, encounter a problem that improvement in fuel efficiency and improvement in stability and controllability of a vehicle are incompatible with each other.

The first conventional system loses a margin for recoverable regenerative energy, resulting in degradation in fuel efficiency, because it prohibits application of the regenerative brake torque in a not-understeer range, for example a neutral range where the vehicle runs with a large steering angle and with road grip.

The second conventional system might cause excessive oversteer on the medium or high friction road, resulting in degradation in stability and/or controllability of the vehicle, because it does not reduce the regenerative brake torque even when excessive oversteer causes during the vehicle runs on a medium or high friction road.

The third conventional system degrades fuel efficiency, because it always reduces the regenerative brake torque under the condition that a steering angle exceeds the predetermined angle and vehicle speed exceeds the predetermined speed, even when oversteer does not occur.

In addition to the above problem, the conventional regenerative braking systems can not judge an occurrence of understeer during regenerative braking with accuracy, which brings difficulty in optimum control of the regenerative braking. In order to control the regenerative braking optimally, an understeer amount during regenerative braking needs to be detected quickly from its weak understeer state.

The occurrence of understeer is conventionally judged based on a variation between actual yaw rate and target yaw rate by using a yaw rate sensor. Such technology is described in Japanese patent laid-open publication No. (Tokkaihei) 07-223520. However, the yaw rate sensor has bad detection accuracy in a small yaw rate range, and is not suitable for a use of controlling the regenerative braking. It has large time lag in detection of an understeer tendency of the vehicle, since it detects yaw rate from yawing movement of its vehicle body after a front left and right wheel speed variation reflects on behavior of the vehicle. Besides, the sensor is sensitive to not only yaw component caused by movement of the vehicle body, but also various components except the yaw component, which degrades accuracy in yaw rate detection of the sensor.

It is, therefore, an object of the present invention to provide a generative braking system for motor vehicles which overcomes the foregoing drawbacks and can detect an understeer amount with accuracy and ensure compatibility between improvement in fuel efficiency and improvement in stability and/or operability of a vehicle by using the accurate understeer amount.

SUMMARY OF THE INVENTION

According to an aspect of the present invention there is provided a regenerative braking system for motor vehicles including a generator, a regenerative braking control means, an actual wheel speed variation calculating means, an estimated road-grip correspondent wheel speed variation calculating means, a steer characteristic judging means and a regenerative braking amount compensating means. The generator is connected with a wheel set, and it is capable of applying regenerative brake torque to the wheel set by generating electricity. The regenerative braking control means controls a regenerative braking amount of the generator based on at least demand brake force amount. The actual wheel speed variation calculating means calculates an actual wheel speed variation between actual outer wheel speed of an outer wheel of steerable wheels and actual inner wheel speed of at least one wheel of a front wheel set and a rear wheel set. The estimated road-grip correspondent wheel speed variation calculating means estimates an estimated road-grip correspondent wheel speed variation corresponding to an outer-to-inner wheel speed variation between outer wheel speed and inner wheel speed of the steerable wheels with road grip. The steer characteristic judging means judges that an estimated understeer amount of a steer characteristic becomes stronger as a numerical value of a correspondent-to-actual wheel speed variation between the estimated road-grip correspondent wheel speed variation and the actual wheel speed variation becomes larger. The regenerative braking amount compensating means compensates the regenerative braking amount so that the regenerative braking amount is decreased more as the estimated understeer amount becomes stronger.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
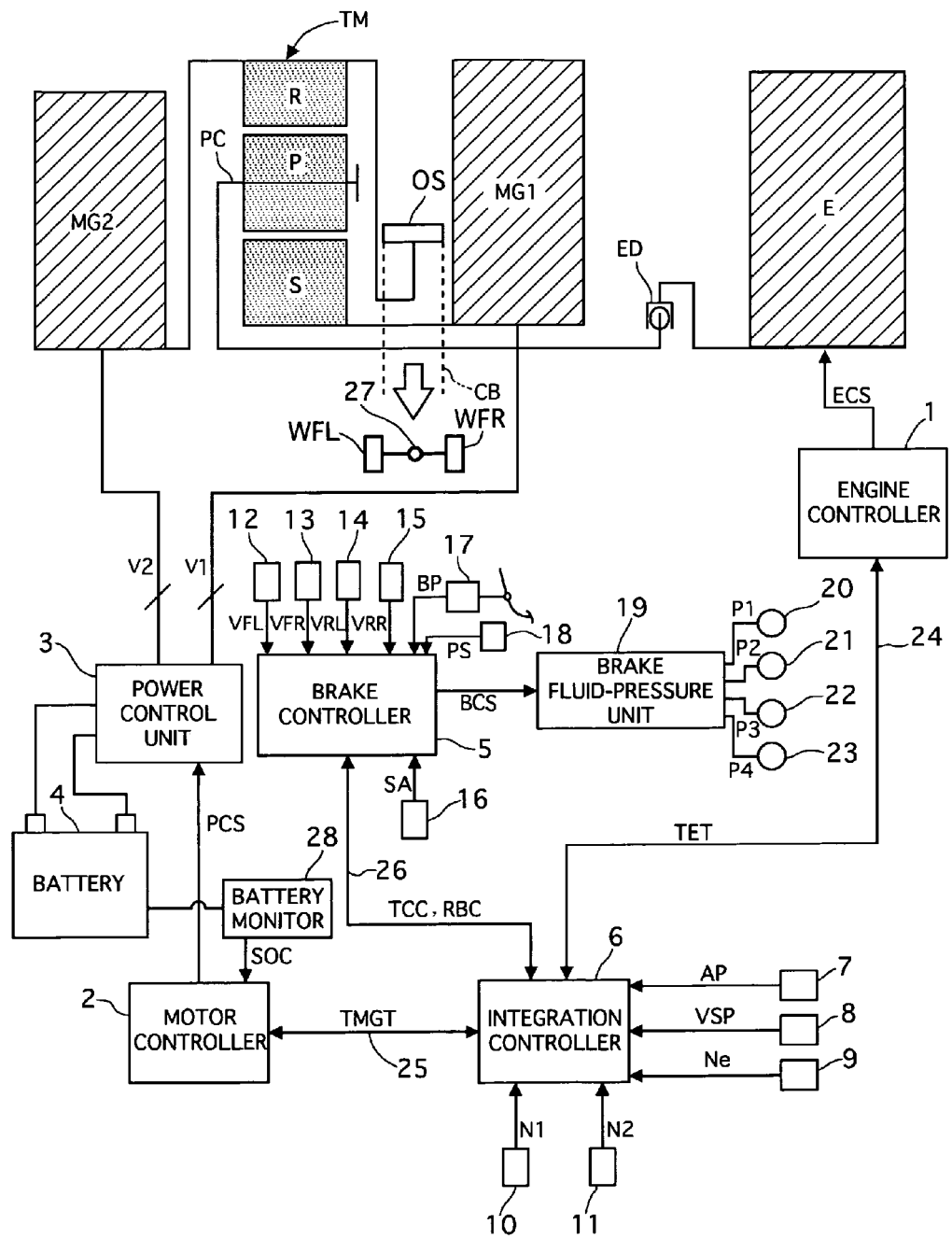
FIG. 1 is a schematic diagram showing a power train and a regenerative braking system, of a first embodiment according to the present invention, provided on a hybrid electric vehicle.

Throughout the following detailed description, similar reference characters and numbers refer to similar elements in all figures of the drawings, and their descriptions are omitted for eliminating duplication.

A regenerative braking system of an embodiment according to the present invention will be described with the accompanying drawings.

FIG. 1 shows a schematic diagram showing a power train and a braking system of a hybrid electric vehicle. The vehicle is equipped with an engine E, a first motor/generator MG1, a second motor/generator MG2, a power split device TM, and a braking system including the regenerative braking system of the first embodiment of the present invention and a fluid-pressure brake system. This vehicle is a front-wheel drive vehicle, which is propelled by using a combination of the engine E and the motor/generators MG1 and MG2.

The engine E employs a gasoline engine, a diesel engine, and the like, and is operated based on an engine control signal outputted from an engine controller 1.

The first and second motor/generators MG1 and MG2 are synchronous motor/generators with a rotor embodying plural interior permanent magnets inside of it and a stator containing the rotor and wound around by windings. The first and second motor/generators MG1 and MG2 are independently controlled based on a power control signal outputted from a motor controller 2 so as to act as either a motor or a generator according to the driving conditions.

The power split device TM is constituted of a single-pinion type planetary gear set, which is provided with a sun gear S, a ring gear R, and a plurality of pinions P that are rotatably supported on a planetary carrier PC and engaged with the sun gear S and the ring gear R. The sun gear S is mechanically connected with the first motor/generator MG1, the ring gear R is mechanically connected with the second motor/generator MG2 and an output drive sprocket OS, and the pinion carrier PC is mechanically connected with the engine E through an engine damper ED.

The output drive sprocket OS is mechanically connected via a chain belt CB with a not-shown output driven sprocket, which is mechanically connected with a front left wheel WFL and a front right wheel WFR through a differential gears 27 and drive-shafts connecting the differential gears 27 and the wheels WFL and WFR with each other. The front left wheel WFL and the front right wheel WFR corresponds to a front wheel set of the present invention.

The vehicle is also equipped with the engine controller 1 for controlling the engine E, the motor controller 2 for controlling the first and second motor/generator MG1 and MG2, a brake controller 5 for controlling a brake fluid-pressure unit 19, and an integration controller 6 for totally controlling the controllers 1, 2, and 5.

The engine controller 1 is electrically connected to the integration controller 6 to receive a target engine torque command signal TET from the integration controller 6 receiving an accelerator pedal open-degree signal AP and an engine speed signal Ne and outputs an engine operation command signal ECS to a not-shown throttle valve actuator for example. The engine operation command signal is used for controlling an operation point of engine speed Ne and engine torque Te. The throttle valve actuator controls an open position of a throttle valve of the engine E to obtain the required amount of intake air.

The motor controller 2 is electrically connected to the integration controller 6 to receive a target motor/generator torque command signal TMGT therefrom and a state-of-charge signal SOC from a battery monitor 28 and outputs the power control command signal PCS to a power control unit 3. The power control command signal PCS is used for independently controlling operation points of the first and second motor/generators MG1 and MG2: rotational speed N1 and torque T1 of the first motor/generator MG1 and rotational speed N2 and torque T2 of the second motor/generator MG2.

The battery monitor 28 is electrically connected to the battery 4 and the motor controller 2 for monitoring State of Charge (S.O.C.) of the battery 4 based on voltage, current, temperature, and the like of the battery 4 and output the S.O.C. signal SOC to the motor controller 2.

The power control unit 3 is electrically connected to the motor controller 2 and the battery 4 and constitutes a high voltage power supply system. The unit 3 is equipped with a not-shown joint box for wiring, a not-shown booster converter for supplying a higher, regulated voltage by boosting an input voltage, a not-shown motor inverter that is electrically connected to the stator-wirings of the second motor/generator MG2 and changes direct current voltage into three-phase alternating current voltage V2 to supply it to the second motor/generator MG2 so that the second motor/generator MG2 can act as a motor, and a not-shown generator inverter that is electrically connected to the stator-wirings of the first motor/generator MG1 and changes alternating current voltage, produced by the first motor/generator MG1 that acts as a generator, into direct current voltage V1. The joint box is electrically connected to the battery 4 so as to discharge electricity from the battery 4 during motor drive and so as to give a charge of electricity during regenerative brake.

The brake controller 5 is electrically connected to a front left wheel-speed sensor 12, a front right wheel-speed sensor 13, a rear left wheel-speed sensor 14, a rear right wheel-speed sensor 15, a steering-wheel angle sensor 18, a master-cylinder brake pressure sensor 17, a brake-pedal stroke sensor 18 to receive a front left wheel-speed signal VFL, a front right wheel-speed signal VFR, a rear left wheel-speed signal VRL, a rear right wheel-speed signal VRR, a steering-wheel angle signal SA, a master-cylinder brake pressure signal PS, and a brake-pedal stroke signal PS, respectively, and outputs a brake control signal BCS to the brake fluid-pressure unit 19. The brake controller 5 controls front left brake pressure P1, front right brake pressure P2, rear left brake pressure P3, and rear right brake pressure P4 under Anti-lock Brake System (A.B.S.) control when the vehicle is braked on a low friction road or braked hard. It also controls cooperative braking consisting of regenerative braking and service brake due to the brake pressures P1 to P4 by outputting a regenerative brake command signal RBC to the integration controller 6 and by outputting the brake control signal BCS to the brake fluid-pressure unit 19 during engine-braking or brake-pedal depression.

The brake fluid-pressure unit 19 is electrically connected to the brake controller 5 to receive the brake control signal BCS therefrom and has electromagnetic valves for producing the front left brake pressure P1, the front right brake pressure P2, the rear left brake pressure P3, and the rear right brake pressure P4 to be supplied to a front left wheel cylinder 20, a front right wheel cylinder 21, a rear left wheel cylinder 22, and a rear right wheel cylinder 23, respectively, based on the brake control signal BCS. The front left wheel cylinder 20, the front right wheel cylinder 21, the rear left wheel cylinder 22, and the rear right wheel cylinder 23 are provided on the front left wheel WFL, the front right wheel WFR, a not-shown rear left wheel, and a rear right wheel, respectively, so that they can apply brake force to them independently from one another.

The integration controller 6 is electrically connected to an accelerator sensor 7, a vehicle speed sensor 8, an engine speed sensor 9, a first motor/generator rotational speed sensor 10 and a second motor/generator rotational speed sensor 11 to receive an accelerator opening degree signal AP, a vehicle speed signal VSP, an engine speed signal Ne, a first motor/generator rotational speed signal N1 and a second motor/generator rotational speed signal N2, respectively. The integration controller 6 is also electrically connected to the engine controller 1, the motor controller 2, and the brake controller 5 to allow two-way communication between them through two-way communication cables 24, 25, and 26 and totally control them for managing the overall consumption energy of the vehicle so that the vehicle can run at its maximum efficiency. The controller 6 outputs the target engine torque command signal TET to the engine controller 1 to control the operation point of the engine E during sudden acceleration for example, and outputs the target motor/generator torque command signal TMGT to control the operation points of the first and second motor/generators MG1 and MG2 during braking or starting for example.

Next, driving performance of the hybrid electric vehicle with the regenerative braking system will be described with reference to the accompanying drawings of FIGS. 2A and 2B.

Figure 2A:
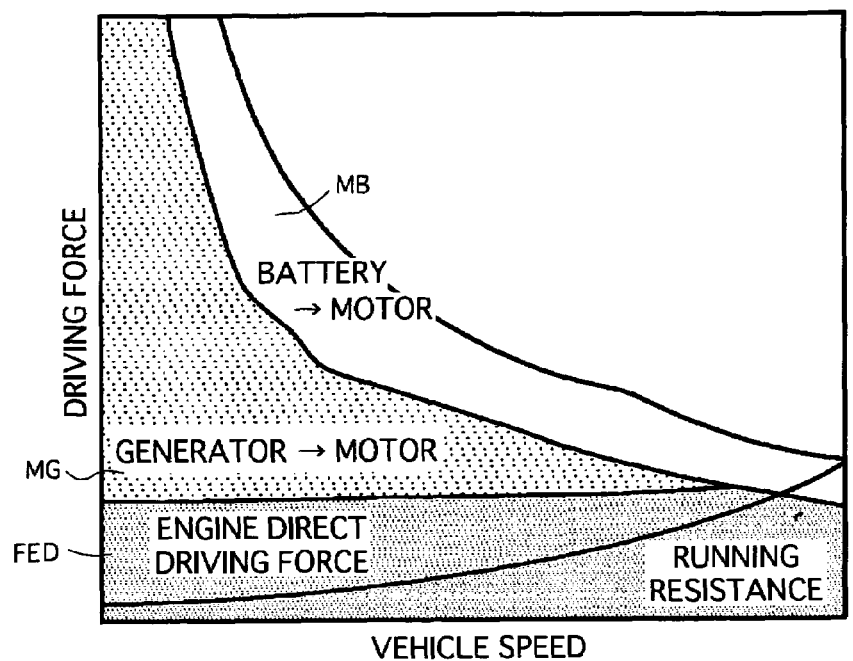
FIG. 2 is a characteristic diagram showing a relationship between vehicle speed and driving force needed to run the hybrid electric vehicle shown in FIG. 1.
FIG. 2B is a conceptual diagram of comprising items of the driving force when an engine, a first motor/generator, and a second motor/generator of the power train shown in FIG. 1 are activated.
Figure 2B:
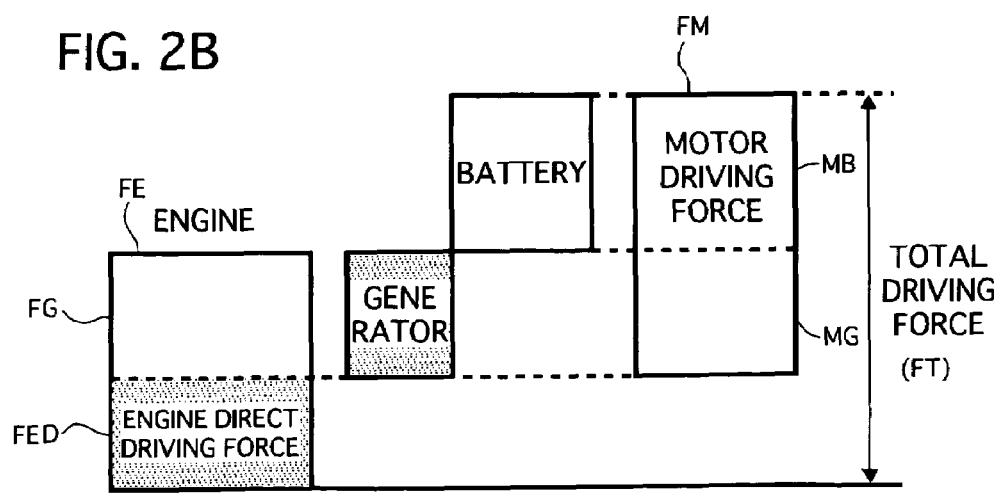

FIG. 2A is a characteristic diagram showing the driving performance of the vehicle, and FIG. 2B is a conceptual diagram of comprising items of driving force when the engine E and the first and second motor/generators MG1 and MG2 are activated.

As shown in FIG. 2A, the driving force for running the vehicle decreases as vehicle speed increases. In order to run the vehicle at constant speed, the vehicle requires driving force larger than running resistance, which increases as the vehicle speed increase. The driving torque is obtained by at least one of engine direct driving force FED, driving force MG outputted from the second motor/generator MG2 driven by electric power supplied from the first motor/generator MG1 and driving force MB outputted from the second motor/generator MG2 driven by electric power supplied from the battery 4.

As shown in FIG. 2B, the maximum total driving force FT of the hybrid electric vehicle is obtained when the engine E is activated to propel the vehicle and drive the first motor/generator MG1 to produce electric power and the second motor/generator MG2 receives the electric power from the first motor/generator MG1 and another electric power from the battery 4 to propel the vehicle. Specifically, the maximum total driving force FT is obtained by adding the engine direct driving force FED of the engine E and the driving force FM of the second motor/generator MG2, where the engine direct driving force FED is a difference between total driving force FE outputted from the engine E and driving force FG for the engine E to drive the first motor/generator MG1 for electric power generation, and the driving force FM of the second motor/generator MG2 is the sum of the driving force MG and the driving force MB.

Note that, in the above operation, the driving force FED of the engine E and the driving force FM of the second motor/generator MG2 are transmitted to the front wheels WFL and WFR, not through the split power device TM, which improves total fuel efficiency of the vehicle. Besides, the driving force FM of the second motor/generator MG2 is set to become larger than the engine direct driving force FED as the vehicle speed becomes lower, since efficiency of the engine E is low in a low speed area. This also contributes to the fuel efficiency. Therefore, the driving force can be controlled seamlessly and in high response to a driver's demand from low vehicle speed to high vehicle speed and from a low power drive during normal running to full power drive.

Incidentally, in the hybrid electric vehicle of the first embodiment, the engine E and the motor/generators MG1 and MG2 are mechanically connected with tires of the front left and right wheels through the power split device TM, but not through a clutch. In addition, large part of engine power is converted by the generator MG1 into electric energy, being supplied to the motor MG2, which is a high output and high response one, to run the vehicle. This requires protection of the power controller 3 from excess current and/or protection of parts of the power train from over speed rotation of the pinions of the power split device TM, because excess current may run in the power controller 3 or excessive force may act on the parts in a case where driving force is changed suddenly due to slip of the tires, lock of braked tires, and the like when the vehicle runs on a slippery road such as an icy road. In order to remove the above risk, by using a high output and high response characteristic of the motor MG2, the motor MG2 is used to control traction of the wheels for ensuring safety running on a low friction road so that slip of tires is instantly detected and the motor recovers grips of the tires.

Next, brake performance of the hybrid electric vehicle will be described with reference to the accompanying drawings of FIGS. 3A and 3B.

The vehicle of the first embodiment is provided with the regenerative braking system, which is provided with the second motor/generator MG2 acting as a generator to recover kinetic energy during engine braking and service brake application by converting it into electric energy to be supplied to the battery 4. This electric energy is reutilized to run the second motor/generator MG2 as a motor. Note that this regenerative braking is used in addition to the engine braking and/or the service brake.

Figure 3A:
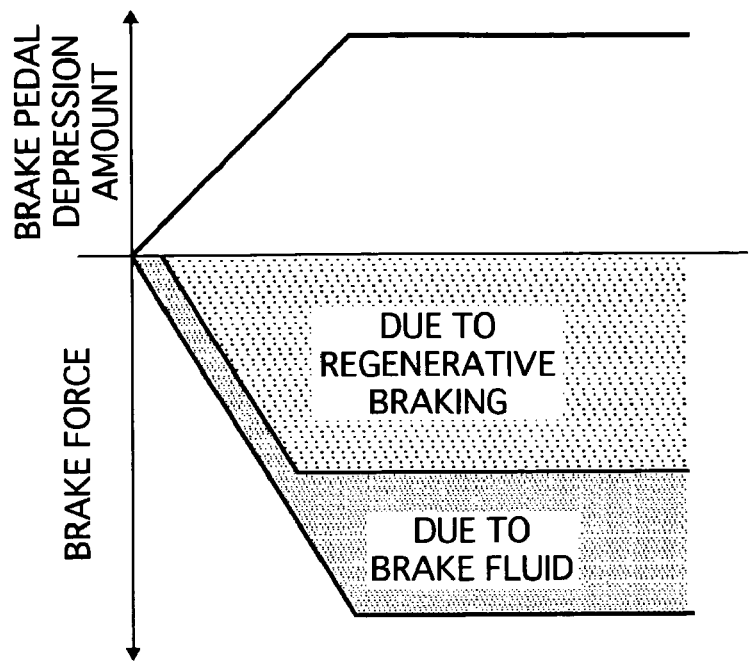
FIG. 3A is a characteristic diagram showing a relationship between a brake pedal depression amount and brake force obtained by regenerative braking and by service brake in a conventional regenerative system.

In a conventional regenerative braking system, it calculates demand brake force based on a brake-pedal depression amount, shown in an upper part of FIG. 3A, and applies brake force obtained by brake fluid pressure and brake force obtained by regenerative braking to the wheels WFL and WFR at its contribution rate of them that is predetermined at a fixed value regardless of the demand brake force, as shown in a lower part of FIG. 3A. This reduces a regenerative energy amount by losing a margin for recoverable regenerative energy. The braking obtained by brake fluid pressure, which is also called as service brake, corresponds to mechanical braking of the present invention.

Figure 3B:
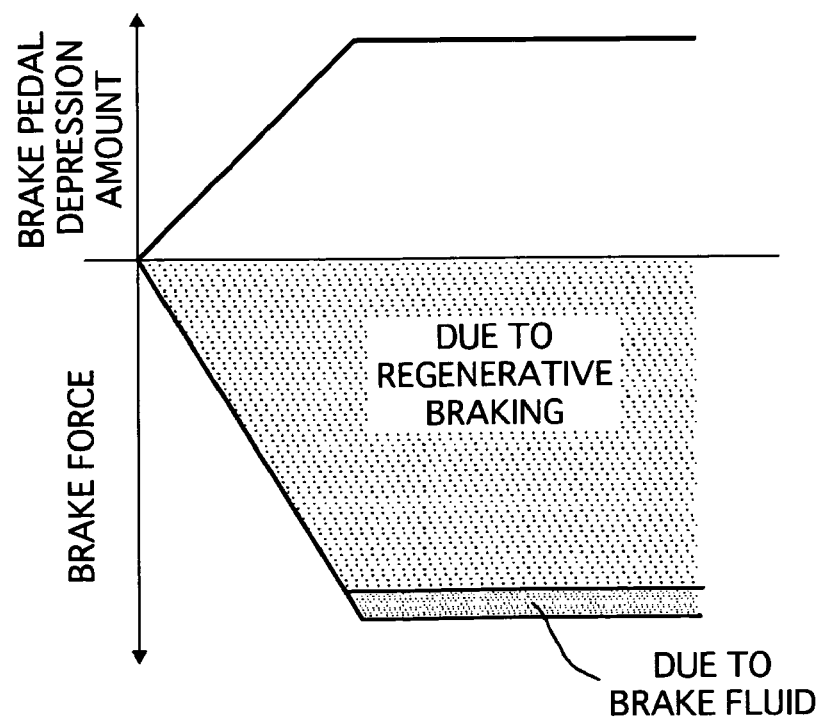
FIG. 3B is a characteristic diagram showing a relationship between a brake pedal depression amount and brake force obtained by regenerative braking and by service brake in the regenerative system of the first embodiment shown in FIG. 1.

On the other hand, in the regenerative braking system of the first embodiment, it calculates demand brake force based on a brake pedal depression amount, shown in an upper part of FIG. 3B, and applies brake force obtained by brake fluid pressure and brake force obtained by regenerative braking to the wheels WFL and WFR at its contribution rate of them that is determined by giving priority to the regenerating braking so that its regenerative energy amount can be maximized, as shown in a lower part of FIG. 3B. This contribution ratio is allowed to be 100% in a case where the demand brake force can be obtained only by the regenerative brake force, and thereby improving the fuel efficiency. In particular, this improvement in the fuel efficiency stands out in a case of repeatedly accelerating and deaccelerating the vehicle, because of its high energy-recovery efficiency and energy recovery up to lower speed.

Next, operation modes of the hybrid electric vehicle will be described with reference to the accompanying drawings of 4A to 4E.

The operation modes includes an at-rest mode, a vehicle starting mode, an engine starting mode, a normal running mode, and an acceleration mode. A state of the engine E, the first motor/generator MG1, and the second motor/generator MG2 are illustrated by using a common velocity diagrams shown in FIGS. 4A to 4B.

The common velocity diagram is often used to show relationships among velocities of three rotatable members of a planetary gear set consisting of a sun gear, a ring gear, and a pinion carrier. The diagram has a plurality of vertical axes that correspond to the sun gear, the ring gear, and the pinion carrier to indicate their rotational velocities and a horizontal axis that is positioned at a velocity of zero r.p.m. The vertical axes are arranged along the horizontal axis at positions according to a teeth ratio determined by (the teeth number of the sun gear)/(the teeth number of the ring gear) of the planetary gear set. Namely, the vertical axes are positioned so that when the interval between the axes of the pinion carrier and the sun gear is set to be 1, the interval between the axes of the ring gear and the pinion carrier is set to be the teeth ratio. If the rotatable element rotates in a driving direction, its velocity point on its vertical axis is in the upper zone over the horizontal axis, while if the rotatable element rotates in a driven direction, its velocity point on its vertical axis is in the lower zone under the horizontal axis. The velocity points, ordinates representing velocities on the respective vertical axes, are always positioned on a straight line, because meshing relationships between the sun gear and the pinions and between the pinions and the ring gear is linear.

Figure 4A:
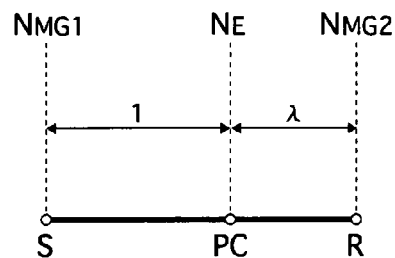
FIGS. 4A to 4E are schematic diagrams showing a relationship among engine speed, first motor/generator speed and second motor/generator speed of the engine, the first motor/generator, and the second motor/generator of the first embodiment, in an at-rest mode, a vehicle starting mode, an engine starting mode, a normal running mode, and an acceleration mode, respectively.

In the at-rest mode, as shown in FIG. 4A, rotational velocities of the engine E, the first motor/generator MG1, and the second motor/generator MG2 are zero, since they stop. Accordingly, the front wheels WFL and WFR are rested.

Figure 4B:
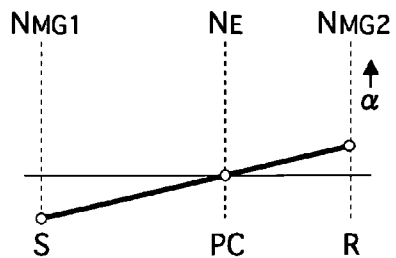

In the vehicle starting mode, as shown in FIG. 4B, the second motor/generator MG2 is supplied with electric power from the battery 4 to act as a motor, while the engine E is stopped. Only the motor MG2 propels the vehicle to start. The motor MG2 drives the ring gear R of the power split device TM to rotate the front wheels $W_{FL}$ and $W_{FR}$. The ring gear R is accelerated, as indicated by an arrow α, by the motor MG2, resulting in rotation of the generator MG1 in a direction opposite to that of the motor MG2. In this operation, the pinion carrier PC is stopped.

Figure 4C:
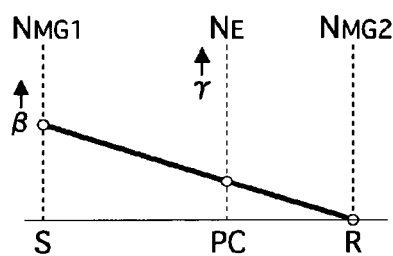

In the engine starting mode, as shown in FIG. 4C, the first motor/generator MG1 is supplied with electric power from the battery 4 to act as an engine stator and drive the sun gear S as indicated by an arrow β, while the second motor/generator MG2 is stopped. Accordingly, the sun gear S rotates the pinion carrier PC in a driving direction to supply the engine E with torque so as to start it. After starting the engine E, the generator MG1 starts to be driven by the activated engine E, and thereby starting generation of electric power, which is supplied to the battery 4 and/or the motor MG2.

Figure 4D:
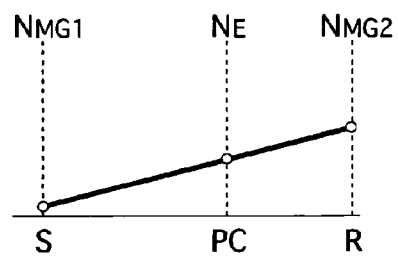
Figure 4E:
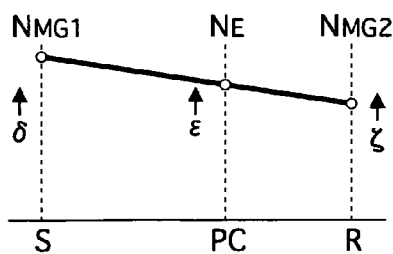

In the normal running mode (a mode in which the vehicle runs at constant speed), as shown in FIG. 4D, the front wheels $W_{FL}$ and $W_{FR}$ are mainly driven by the engine E through the pinion carrier PC. In this mode, an electricity generation amount of the generator MG1 is suppressed at the minimum level for enhancing its total fuel efficiency.

In the acceleration mode, as shown in FIG. 4D, the engine E is supplied with more fuel so as to increase its rotational speed as indicated by an arrow ε, which causes the generator MG1 to increase its rotational speed as indicated by an arrow δ and produce electric power. The electric power outputted from the generator MG1 and the battery 4 is supplied to the motor MG2 so that it can output large torque to increase its rotational speed as indicated by an arrow ζ. Accordingly, the vehicle is accelerated by large torque obtained by the engine E and the motor MG2.

In a reverse running mode, the rotational speed of the generator MG1 is increased, while increase of engine speed is suppressed, which causes the rotational speed of the sun gear S becomes higher than the engine speed, thereby the rotational speed of the ring gear R becoming lower, under the horizontal axis in the common velocity diagram of FIG. 4D.

Turning on an ignition key when the engine E is cold, the engine E starts to warm it and stops immediately after its warm-up. When the vehicle starts or runs at low speed, and when load on the vehicle is low, the engine E is stopped and only the motor MG2 propels the vehicle, because fuel efficiency if the engine E is not good in these running condition. In order to run the vehicle at a constant speed, the engine E is activated to output its mechanical power, a part of which directly drives the front wheel WFL and WFR through the power split device TM, and the rest of it drives the generator MG1 to convert the mechanical power into electric energy for supplying it to the motor MG2. At full acceleration, the battery 4 also supplies the motor MG2 with electric energy so as to obtain larger driving force by the motor MG2. When slowing down or braking the vehicle, the front wheels WFL and WFR drive the second motor/generator MG2 to act as a generator and recover braking energy. This recovered electric energy is transmitted to and accumulated in the battery 4. When a charge amount of the battery 4 is less than a predetermined value, the first motor/generator MG1 starts to be driven by the engine E so as to charge the battery 4. The engine E is automatically stopped when the vehicle stops, except when an air conditioner is operated or except when charging the battery 4.

Next, the regenerative braking system of the first embodiment will be described in detail with reference to the accompanying drawings of FIGS. 5 to 12.

Figure 5:
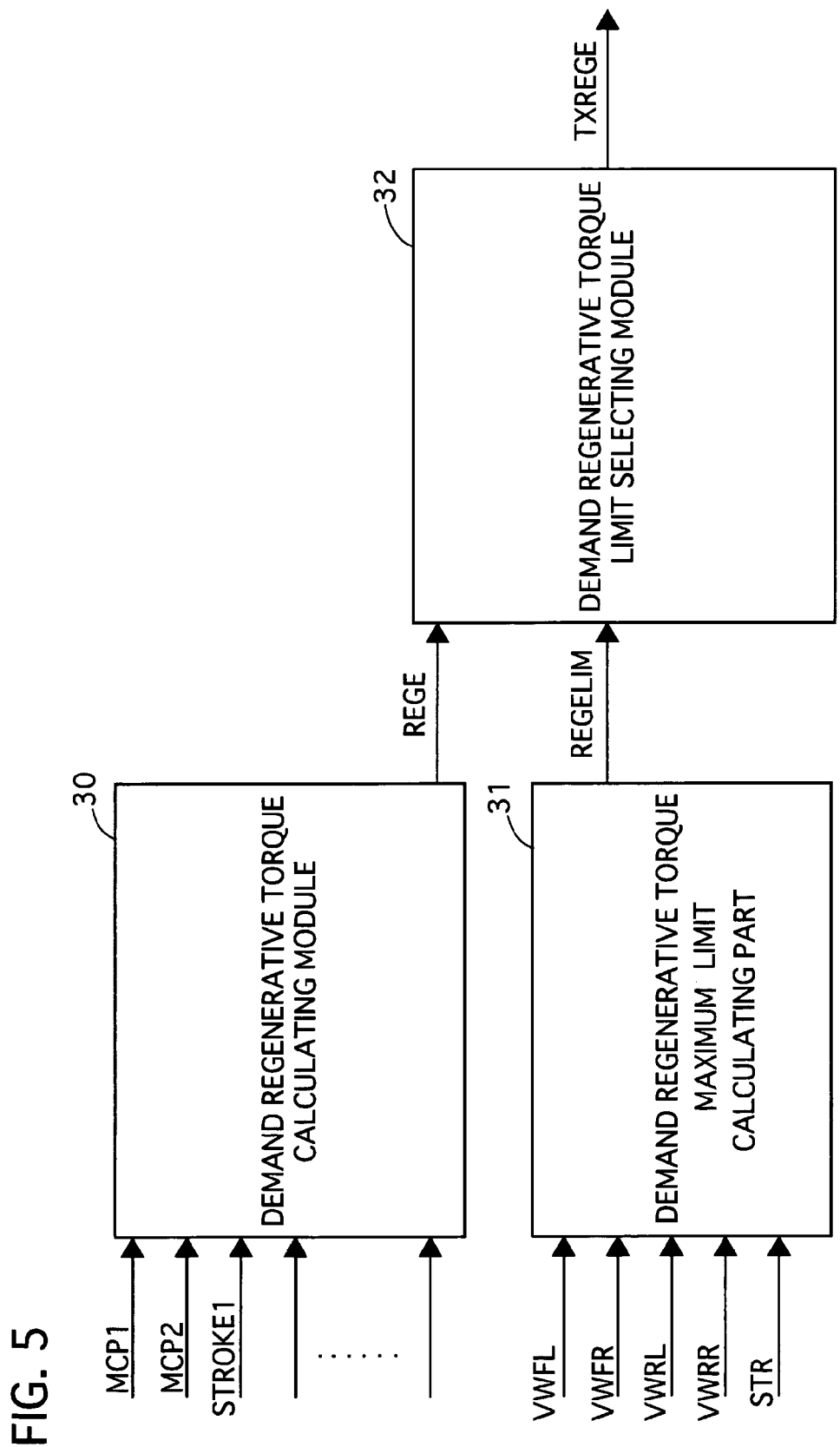
FIG. 5 is a control block diagram of a brake controller used in the regenerative braking system of the first embodiment shown in FIG. 1.

Referring to FIG. 5, which shows a control block diagram of a regenerative brake controller provided in the brake controller 5. The regenerative controller includes a demand regenerative torque calculating module 30, a demand regenerative torque maximum limit calculating part 31, and a demand regenerative torque selecting module 32.

The demand regenerative torque calculating module 30 receives information on a first master-cylinder pressure MCP1, a secondary master-cylinder pressure MCP2, and a brake pedal stroke STROKE1 from the master-cylinder brake pressure sensor 17 and the brake-pedal stroke sensor 18 and calculates demand regenerative torque REGE based on the information. The demand regenerative torque calculating module 30 acts as a regenerative braking control means of the present invention.

The demand regenerative torque maximum limit calculating part 31 receives information on front wheel speed VWFL, front right wheel speed VWFR, rear left wheel speed VWRL, rear right wheel speed VWRR, and steering angle STR from the front left wheel-speed sensor 12, the front right wheel-speed sensor 13, the rear left wheel-speed sensor 14, the rear right wheel-speed sensor 15, and the steering-wheel angle sensor 18, respectively, and calculates a demand regenerative torque maximum limit REGELIM. A detail structure of this calculating part 31 will be described in detail later.

The demand regenerative torque selecting module 32 receives the demand regenerative torque REGE and the demand regenerative torque maximum limit REGELIM from the demand regenerative torque calculating module 30 and the demand regenerative torque maximum limit calculating part 31 and selects selected demand regenerative torque REGEMIN by using select-low principle. Then, the selecting module 32 obtains final demand regenerative torque TXREGE from the selected demand regenerative torque REGEMIN by using a filter with its maximum and minimum limits and outputs the final demand regenerative torque TXREGE to the integration controller 5.

Figure 6:
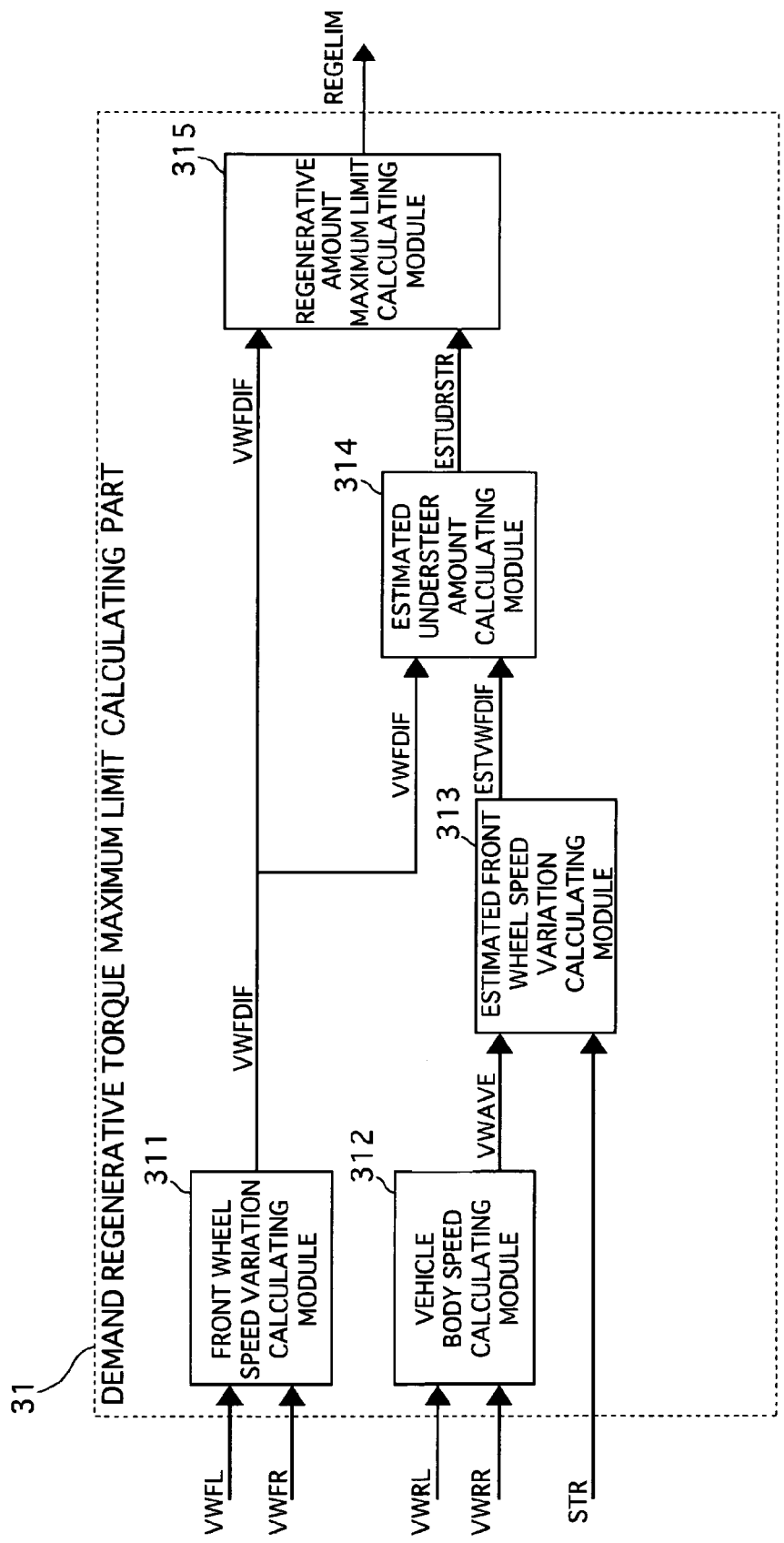
FIG. 6 is a control block diagram of a demand regenerative torque maximum limit calculating part used in the brake controller of the regenerative braking system shown in FIG. 1.

Referring to FIG. 6, the demand regenerative torque maximum limit calculating part 31 has a front wheel speed variation calculating module 311, a vehicle body speed calculating module 312, an estimated front wheel speed variation calculating module 313, an estimated understeer amount calculating module 314, and a regenerative amount maximum limit calculating module 315.

Figure 7:
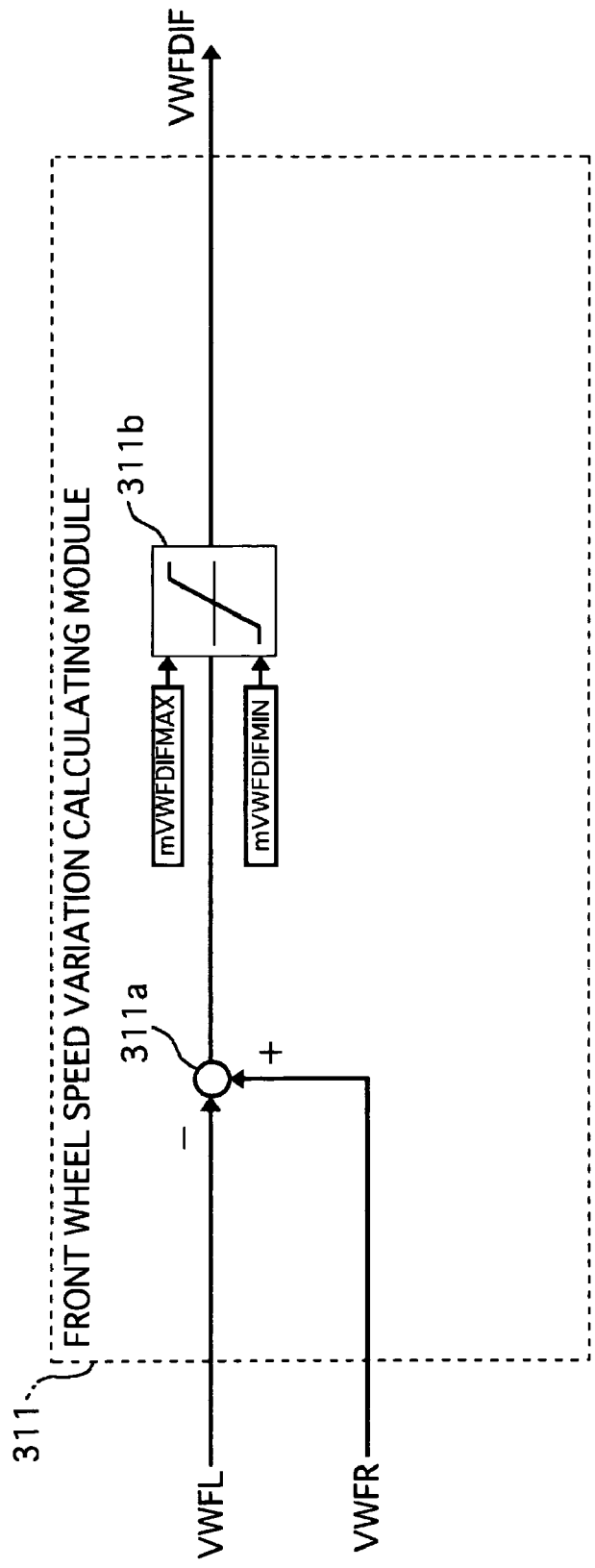
FIG. 7 is a control block diagram of a front wheel speed variation calculating module used in the demand regenerative torque maximum limit calculating part, shown in FIG. 6, of the brake controller of the regenerative braking system shown in FIG. 1.

The front wheel speed variation calculating module 311 is used for calculating an actual front wheel speed VWFDIF between front left wheel speed VWFL and front right wheel speed VWFR to obtain an actual steering amount of the vehicle. This module 311 is, as shown in FIG. 7, electrically connected to the front left wheel speed sensor 12 and the front right wheel speed sensor 13 to receive the information on the front left wheel speed VWFL and the front right wheel speed VWFR, and is provided with a subtracter 311a that calculates an actual front wheel speed variation (VWFR-VWFL) between the front left wheel speed VWFL and the front right wheel speed VWFR and a limiter 311b that calculates the actual front wheel speed variation VWFDIF from the actual front wheel speed variation (VWFR-VWFL) by using the filter with a maximum front wheel speed variation mVWFDIFMAX and a minimum front wheel speed variation mVWFDIFMIN. The front wheel speed variation calculating module 311 acts as an actual wheel speed variation calculating means of the present invention.

Figure 8:
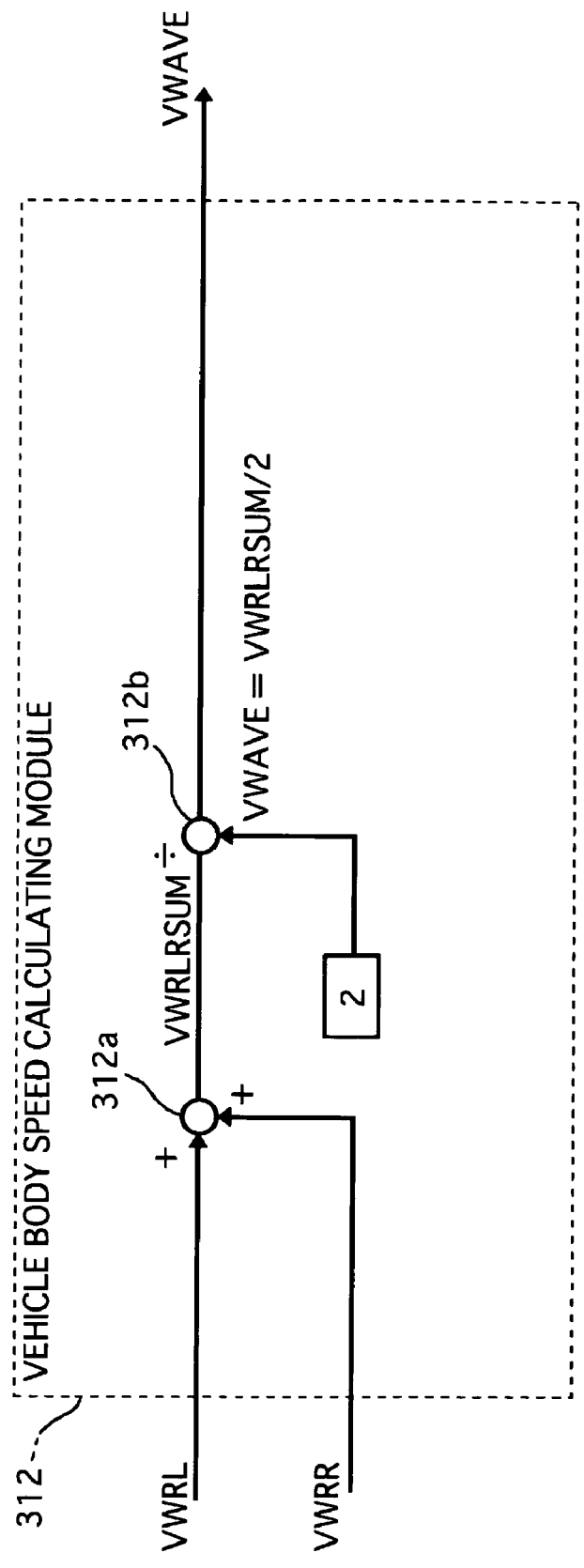
FIG. 8 is a control block diagram of a vehicle body speed calculating module used in the demand regenerative torque maximum limit calculating part, shown in FIG. 6, of the regenerative braking system shown in FIG. 1.

The vehicle body speed calculating module 312 is used for calculating average rear wheel speed VWAVE to obtain an estimated steering amount of the vehicle. This module 312 is, as shown in FIG. 8, electrically connected to the rear left wheel speed sensor 14 and the rear right wheel speed sensor 15 to receive the information on rear left wheel speed VWRL and rear right wheel speed VWRR. It is provided with an adder 312a that adds the rear left wheel speed VWRL and the rear right wheel speed VWRR with each other to obtain the sum VWRLRSUM and a divider 312b that divides the sum VWRLRSUM by two to obtain the average rear wheel speed VWAVE. This average rear wheel speed VWAVE is estimated to be vehicle body speed.

Figure 9:
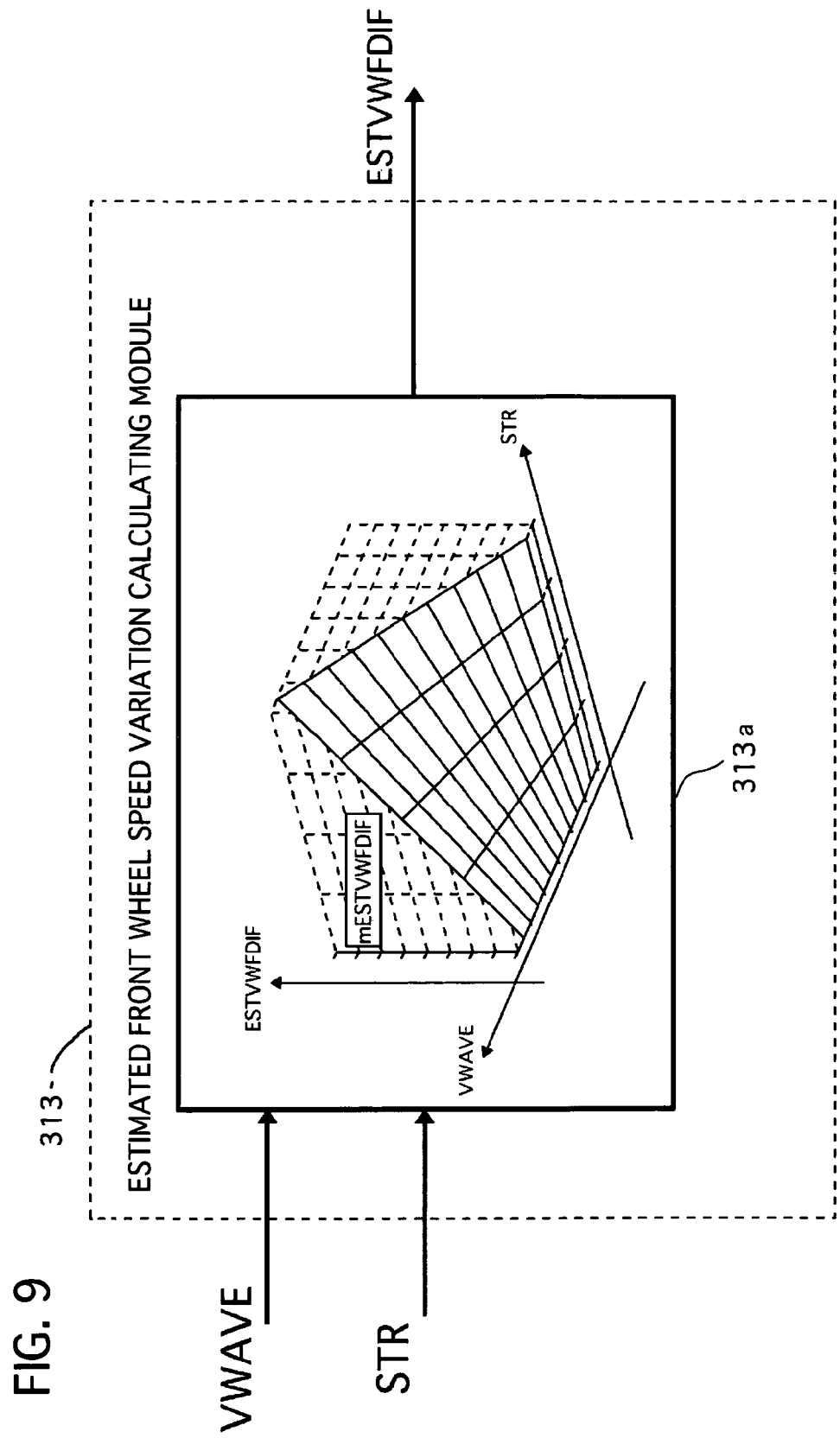
FIG. 9 is a control block diagram of an estimated front wheel speed variation calculating module used in the demand regenerative torque maximum limit calculating part, shown in FIG. 6, of the regenerative braking system shown in FIG. 1.

The estimated front wheel speed variation calculating module 313 is used for calculating an estimated front wheel speed variation ESTVWFDIF when the vehicle corners with road grip. This module 313 is, as shown in FIG. 9, electrically connected to the steering angle sensor 16 and the vehicle body speed calculating module 312 to receive information on the steering angle STR and the average rear wheel speed VWAVE. It is provided with an estimated front wheel speed variation map 313a having data among the steering angle STR, the average rear wheel speed VWAVE, and the estimated front wheel speed variation ESTVWFDIF. This data is set based on experimental values, so that the estimated front wheel speed variation ESTVWFDIF can be determined based on inputted steering angle STR and average rear wheel speed VWAVE by using the map 313a. Incidentally, the estimated front wheel speed variation calculating module 313 acts as an estimated road-grip correspondent wheel speed variation calculating means of the present invention, and the estimated front wheel speed variation ESTVWFDIF corresponds to an estimated road-grip correspondent wheel speed variation of the present invention.

Figure 10:
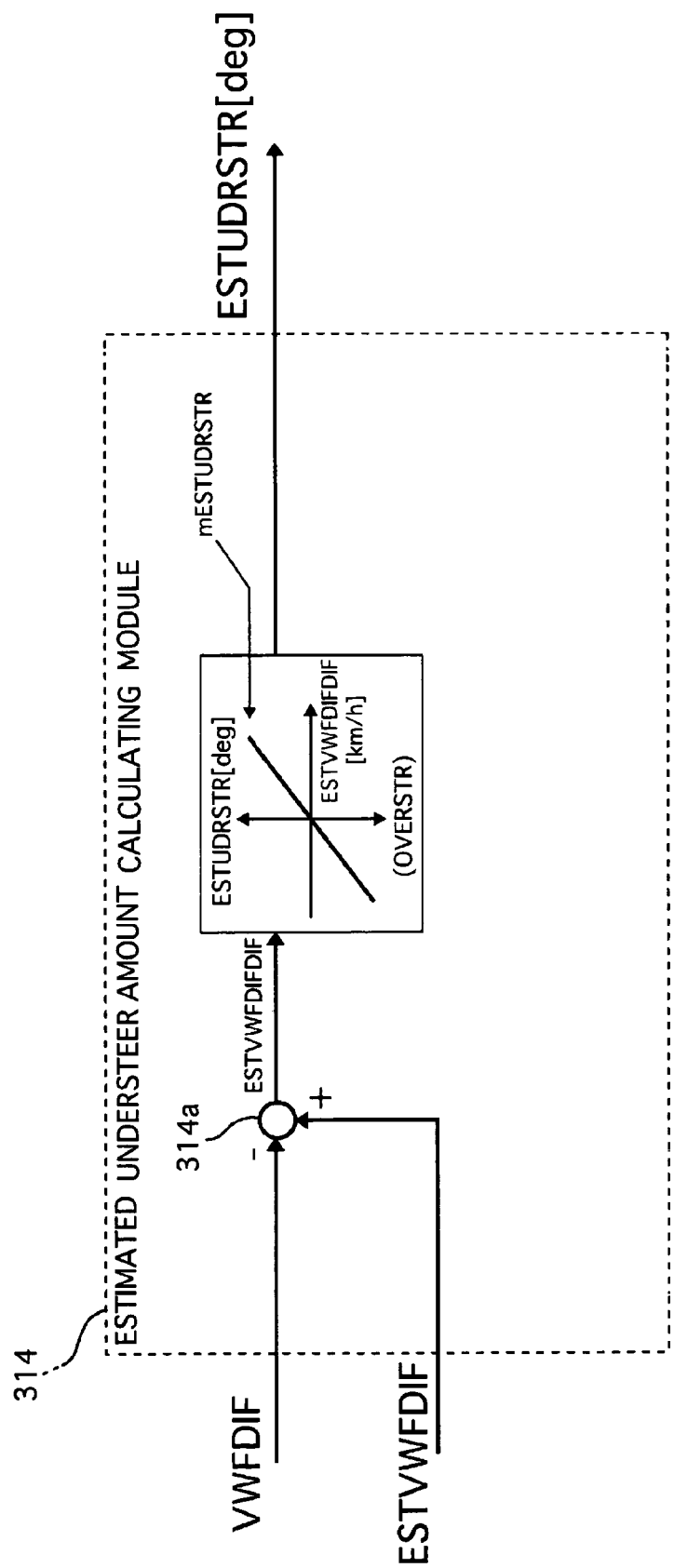
FIG. 10 is a control block diagram of an estimated understeer amount calculating module used in the demand regenerative torque maximum limit calculating part, shown in FIG. 6, of the regenerative braking system shown in FIG. 1.

The estimated understeer amount calculating module 314 is used for calculating an estimated understeer amount ESTUDRSTR. This module 314 is, as shown in FIG. 10, electrically connected to the estimated wheel speed variation calculating module 313 and the front wheel speed variation calculating module 311 to receive information on the estimated wheel speed variation ESTVWFDIF and the actual front wheel speed variation VWFDIF. The module 314 is provided with a subtracter 314a that calculates an estimated-to-actual front wheel speed variation ESTVWFDIFDIF between the estimated front wheel speed variation ESTVWFDIF and the actual front wheel speed variation VWFDIF and an understeer amount calculating map mESTUDRTR for determining an understeer amount ESTUDRSTR based on the estimated-to-actual front wheel speed variation ESTVWFDIF. The estimated understeer amount calculating module 314 acts as a steer characteristic judging means of the present invention.

Figure 11:
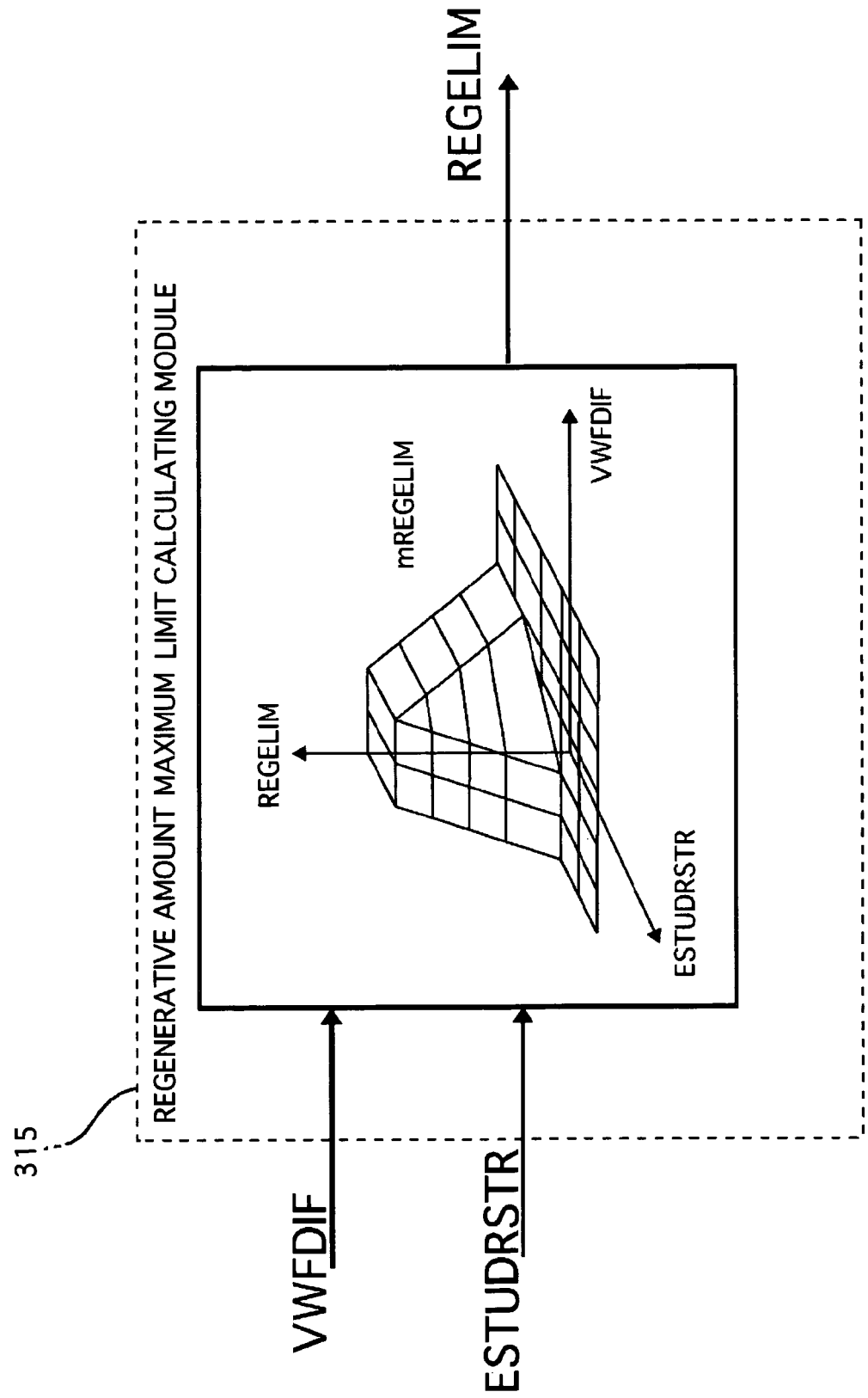
FIG. 11 is a control block diagram of a regenerative amount maximum limit calculating module used in the demand regenerative torque maximum limit calculating part, shown in FIG. 6, of the regenerative braking system shown in FIG. 1.
Figure 12:
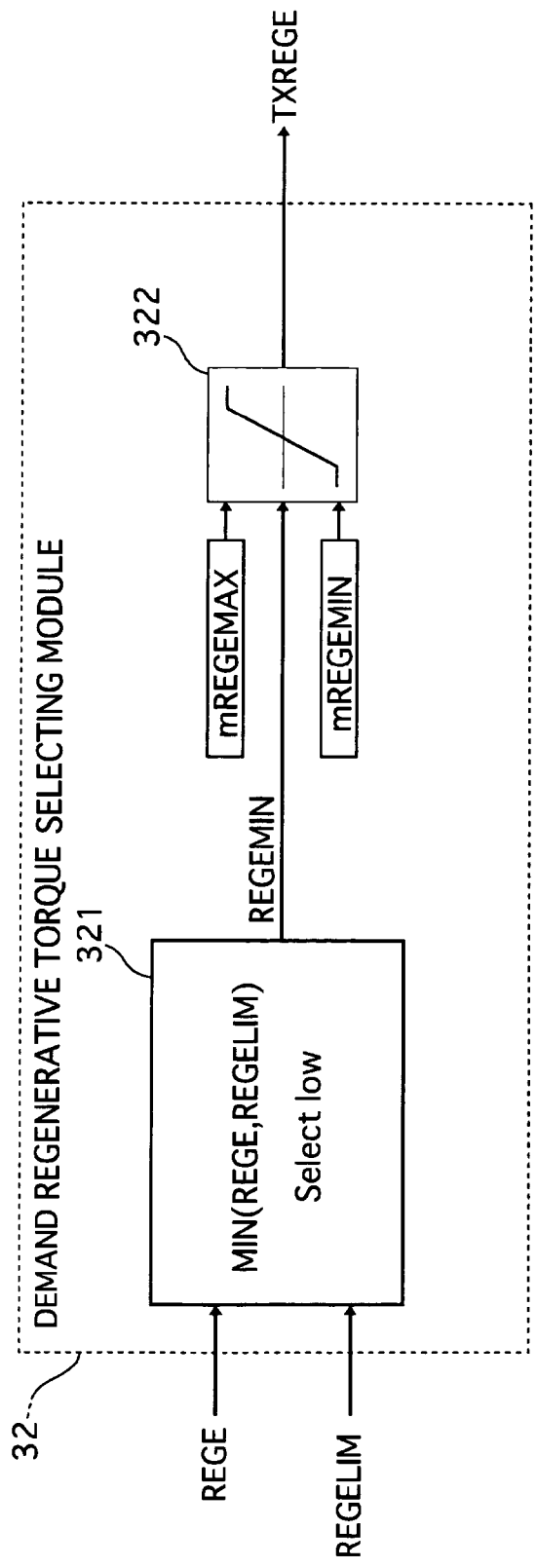
FIG. 12 is a control diagram of a demand regenerative torque selecting module used in the brake controller of the regenerative braking system shown in FIG. 1.

The regenerative amount maximum limit calculating module 315 is used for determining the demand regenerative torque maximum limit REGELIM. The module 315 is, as shown in FIG. 11, electrically connected to the front wheel speed variation calculating module 311 and the estimated understeer amount calculating module 314 to receive the information on the actual front wheel speed variation VWFDIF and the estimated understeer amount ESTUDRSTR. It is provided with a maximum torque calculating table mREGELIM having data on the actual front wheel speed variation VWFDIF, the estimated understeer amount ESTUDRIF, and the regenerative torque maximum limit REGELIM. The demand regenerative torque maximum limit REGELIM is obtained based on inputted actual front wheel speed variation VWFDIF and estimated understeer amount ESTUDRSTR by using the maximum torque calculating map mREGELIM. The regenerative amount maximum limit calculating module 315 acts as a regenerative braking amount compensating means of the present invention.

The demand regenerative torque selecting module 32 is electrically connected to the demand regenerative torque calculating module 30 and the regenerative amount maximum limit calculating module 315 to receive the demand regenerative torque REGE and the demand regenerative torque maximum limit REGELIM. The module 32 is provided with a select-low module 321 that selects the selected demand regenerative torque REGEMIN by using the select-low principle based on the demand regenerative torque REGE and the demand regenerative torque maximum limit REGELIM and a final demand regenerative torque calculating module 322 that calculates the final demand regenerative torque TXREGE based on the selected demand regenerative torque REGEMIN using a filter of its maximum and minimum limits mREGEMAX and mREGEMIN.

The operation of the regenerative braking system of the first embodiment will be described.

First, vehicle behavior during cornering and braking will be described with reference to the accompanying drawings of FIGS. 13 to 20.

Figure 13:
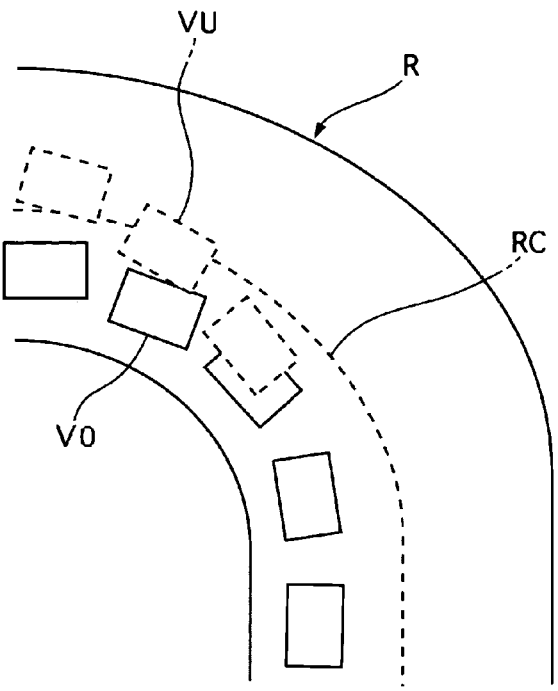
FIG. 13 is a schematic diagram illustrating vehicle behavior when regenerative braking is used to obtain demand regenerative force without its limit on a low friction road.

Referring to FIG. 13, for example, in a case where the vehicle corners and brakes on a low friction road R under cooperative regenerative braking control which controls regenerative braking amount to increase up to demand regenerative torque without a limitation, the vehicle VU understeers excessively and deviates in an outer direction from a cornering line RC along which a driver desires to run as indicated by dashed lines, although the driver wants to run a vehicle V0, indicated by solid lines, along the cornering line RC. This comes from the following reason.

Figure 14:
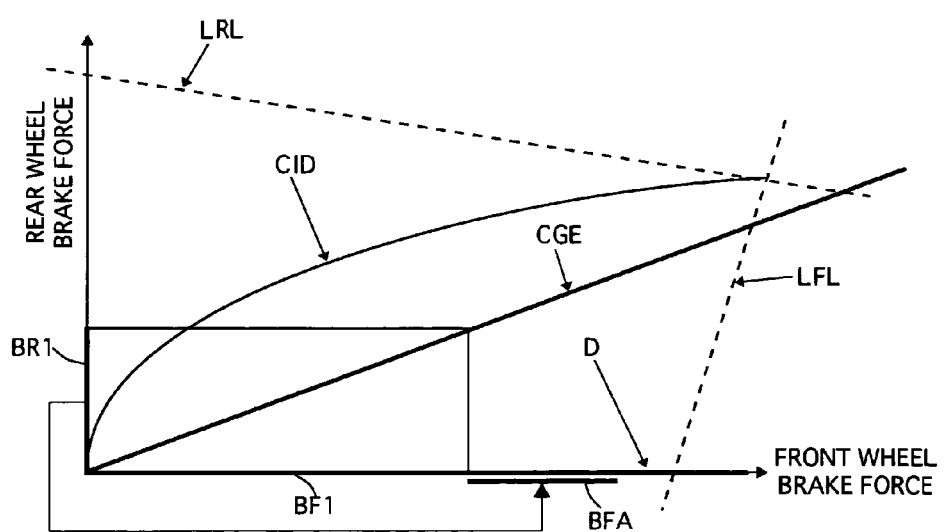
FIG. 14 is a diagram showing a relationship between front wheel brake force and rear brake force.
Figure 15:
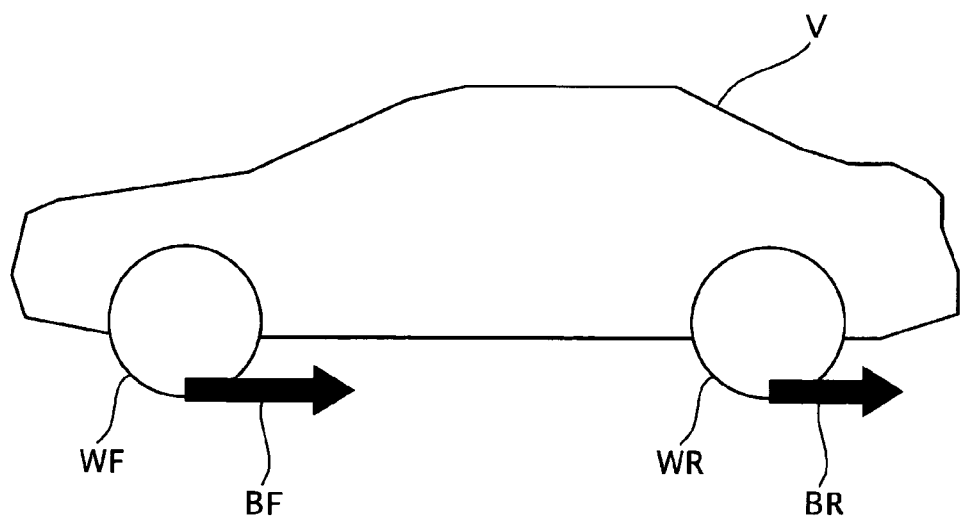
FIG. 15 is a schematic diagram showing an application state of brake force caused only by service brake under an ideal brake force contribution onto front wheels and rear wheels.

In a common vehicle without a proportioning valve or an electric brake force distribution (EBD) system, brake force distribution onto front wheels and rear wheels is obtained based on a straight line approximate to an ideal brake force distribution for obtaining maximum total brake force, as shown in FIGS. 14 and 15. FIG. 14 shows the relationship between front wheel brake force and rear wheel brake force. In FIG. 14, the ideal brake force distribution is illustrated by a curved line CID, the brake distribution of the common vehicle is illustrated by a straight line CGE, a limit of rear wheel lock is illustrated by a dashed line $L_{RL}$, and a limit of front wheel lock is illustrated by a dashed line $L_{FL}$. FIG. 15 shows front wheel brake force BF applied to the front wheels WF and rear wheel brake force BR applied to the rear wheels WR, which is smaller than the front wheel brake force BF, because they are controlled according to the brake force distribution line CGE of the common vehicle. The rear wheels corresponds to a rear wheel set of the present invention.

If the vehicle with the regenerative braking system uses the ideal brake force distribution indicated by the curved line $C_{ID}$ or the brake force distribution indicated by the approximate line CGE, the rear wheels WR need to be braked by brake fluid pressure, because they are not connected with the generators MG1 and MG2. This braking by the pressure reduces regenerative energy amount, resulting in degradation of fuel efficiency.

Figure 16:
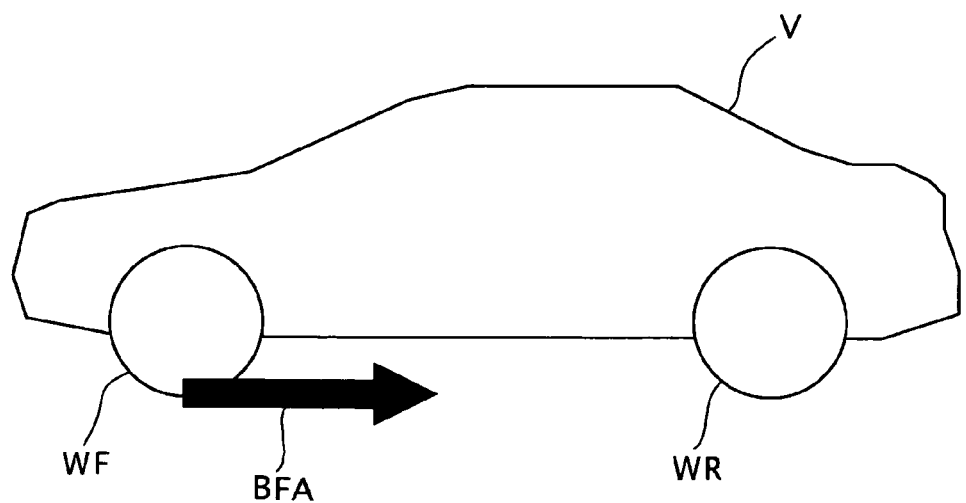
FIG. 16 is a schematic diagram showing an application state of brake force during cooperative braking consisting of service brake and regenerative braking.

In order to avoid the above disadvantage, the regenerative braking system of the first embodiment uses the regenerative braking, applied to the front wheels WF, up to its maximum amount for improving the fuel efficiency as long as excessive understeer of the vehicle behavior does not occur. Therefore, the regenerative brake force is sometimes allowed to set as large as demand brake force regardless of the above brake force distribution lines CID and CGE so as to recover all braking energy of the vehicle, where front and rear brake force due to brake fluid pressure becomes zero and only the front brake force BR due to the regenerative braking is applied to the front wheels WF in a case of braking at deceleration of 0.2 G, for example, as shown in FIG. 16.

This state is shown in FIG. 14, where the rear brake force BR1, indicated by a vertical heavy line, is not applied, but the front brake force BF1 corresponding to the rear brake force BR1 with respect to the distribution line C$_{GE}$ is added by additional front brake force BFA, indicated by a horizontal heavy line, equal to the rear brake force BR1. Note that the front brake force BF1 and the additional front brake force BFA are obtained by the regenerative braking and their sum is within the limit line L$_{FL}$ of the rear wheel lock.

However, if a distribution rate of the front wheels WF is set to become excessive such that the total front brake force D, indicated by a horizontal heavy line, exceeds the limit line L$_{FL}$ of the rear wheel lock, the excessive understeer occurs. This fact requires adequate control of the regenerative braking, which will be described in detail later.

Incidentally, a tire has almost equal traction in any direction relative to a road, forward, rearward, or sideways, and the amount of traction that the tire can generate is determined by a circle of traction, or a friction circle. The diameter of the friction circle represents the amount of traction and varies according to a friction coefficient μ between the tire and the road: the diameter becomes smaller as the friction coefficient μ becomes smaller.

Figure 17:
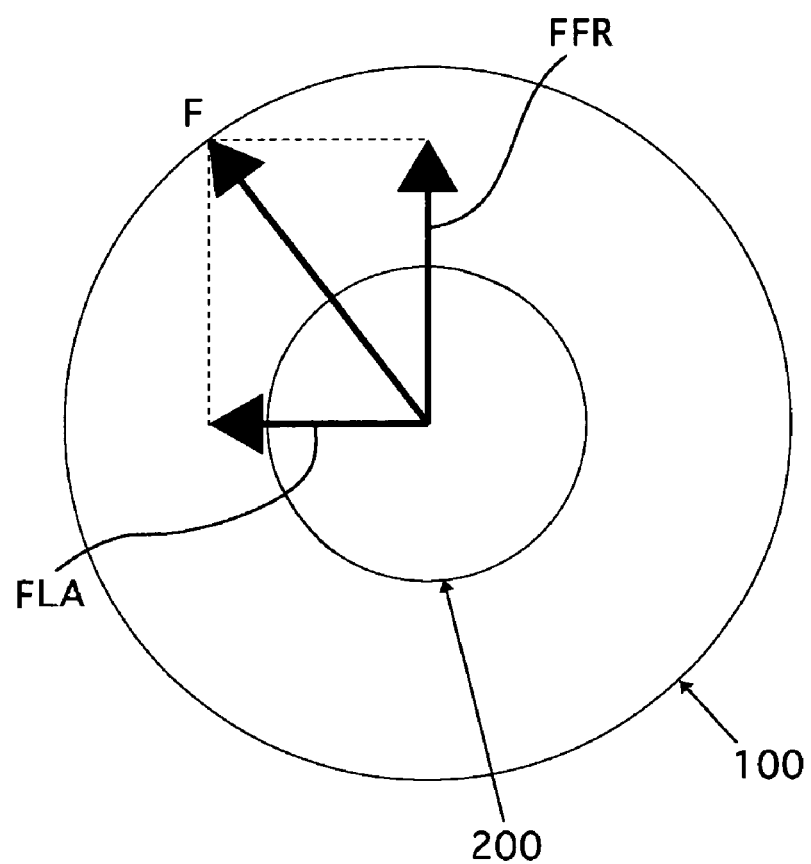
FIG. 17 is a schematic diagram showing friction circles of a tire on roads having friction coefficients of 0.1 and 03, respectively.

FIG. 17 shows two friction circles: a first friction circle 100 at μ of 0.3 and a second friction circle 200 at μ of 0.1. In FIG. 17, when longitudinal directional force FFR is smaller than a diameter of a friction circle, the first friction circle 100 for example, lateral force FLA is obtained as cornering force, since its diameter is equal to the amount of the generatable traction F. This means that the traction F is synthesized from the longitudinal directional force FFR and the lateral force FLA by using composition of vectors. On the other hand, when the longitudinal directional force FFR is larger than a diameter of a friction circle, the second friction circle 200 for example, lateral force FLA is zero, resulting in no cornering force.

As understood from the above description, the cornering force becomes smaller as the friction coefficient μ becomes smaller or as the longitudinal force FFR, such as driving force or brake force, becomes larger. Accordingly, in the hybrid electric vehicle with the regenerative braking system of the first embodiment, the front wheels WF slips more easily than the rear wheels WR during the regenerative braking, thereby easily causing understeer of the vehicle.

Figure 18:
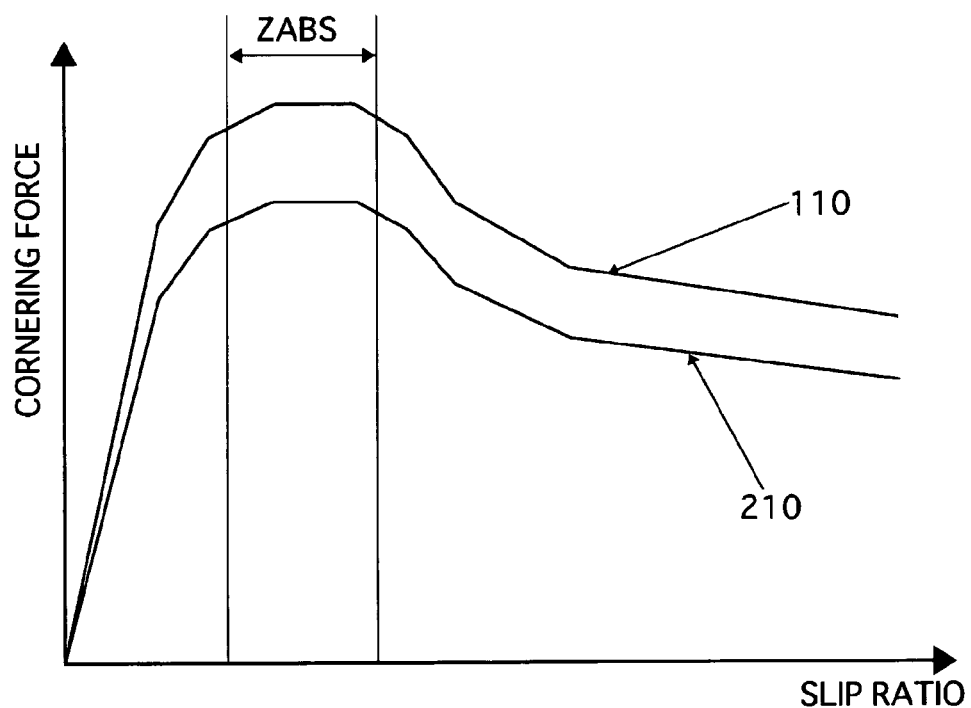
FIG. 18 is a diagram showing a relationship between a slip rate and cornering force of the tire having friction circles shown in FIG. 17.

FIG. 18 shows a relationship between slip rate and cornering force, where the slip rate is obtained by an equation of (Estimated Vehicle Body Speed−Wheel Speed)/(Estimated Vehicle Body Speed)×100%. A first curve 110 indicates cornering force obtainable on a road having the friction coefficient of 0.3, and a second curve 210 indicates cornering force obtainable on a road having the friction coefficient of 0.1. Note that both cornering forces become the highest in a slip range Z$_{ABS}$ having the slip rate of around 20%, which provides the tire with better grip than in other slip range.

The vehicle behavior on a low friction road is different from each other due to the brake force distribution.

Figure 19:
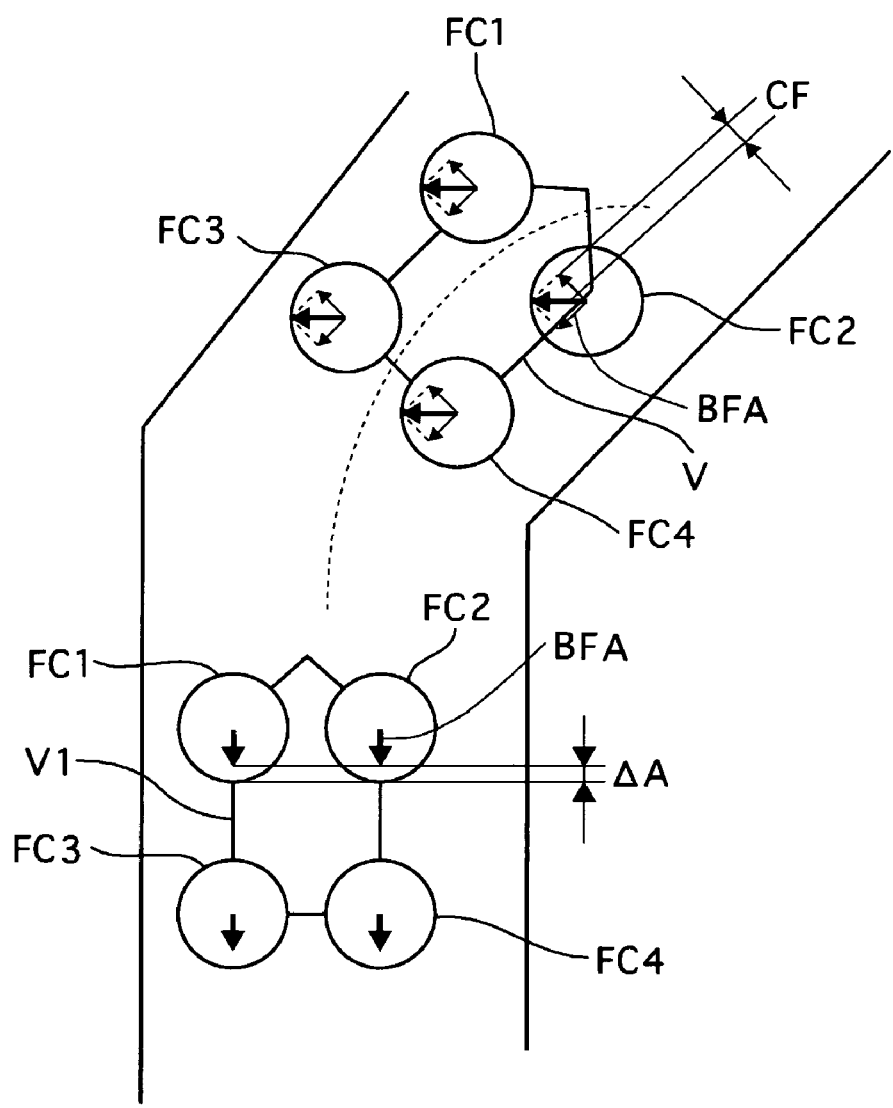
FIG. 19 is a schematic diagram illustrating a state of various forces acting on wheels during normal braking under ideal brake force distribution onto front wheels and rear wheels.

FIG. 19 shows vehicle behavior in a first case that a vehicle V1 corners and is braked according to the ideal brake force distribution. In this case, each brake force applied to tires has a margin ΔA when the vehicle V1 is braked on a straight road before entering a corner, because brake force is applied to the front and rear wheels, so that each brake force can become smaller than a diameter of friction circle of the tire. The margin ΔA is a difference between a brake force value and the diameter of friction circle and provides the tires with cornering force CF when the vehicle V1 corners. Accordingly, the vehicle V1 can corner along a curve line of the road in this case. Although a friction circle FC1 of a front left tire, a friction circle FC2 of a front right tire, a friction circle FC3 of a rear left tire, and a friction circle FC4 of a rear right tire vary according to load to the tires, acceleration and deceleration of the vehicle V1, and others, they are illustrated similarly in FIG. 19 for convenience.

Figure 20:
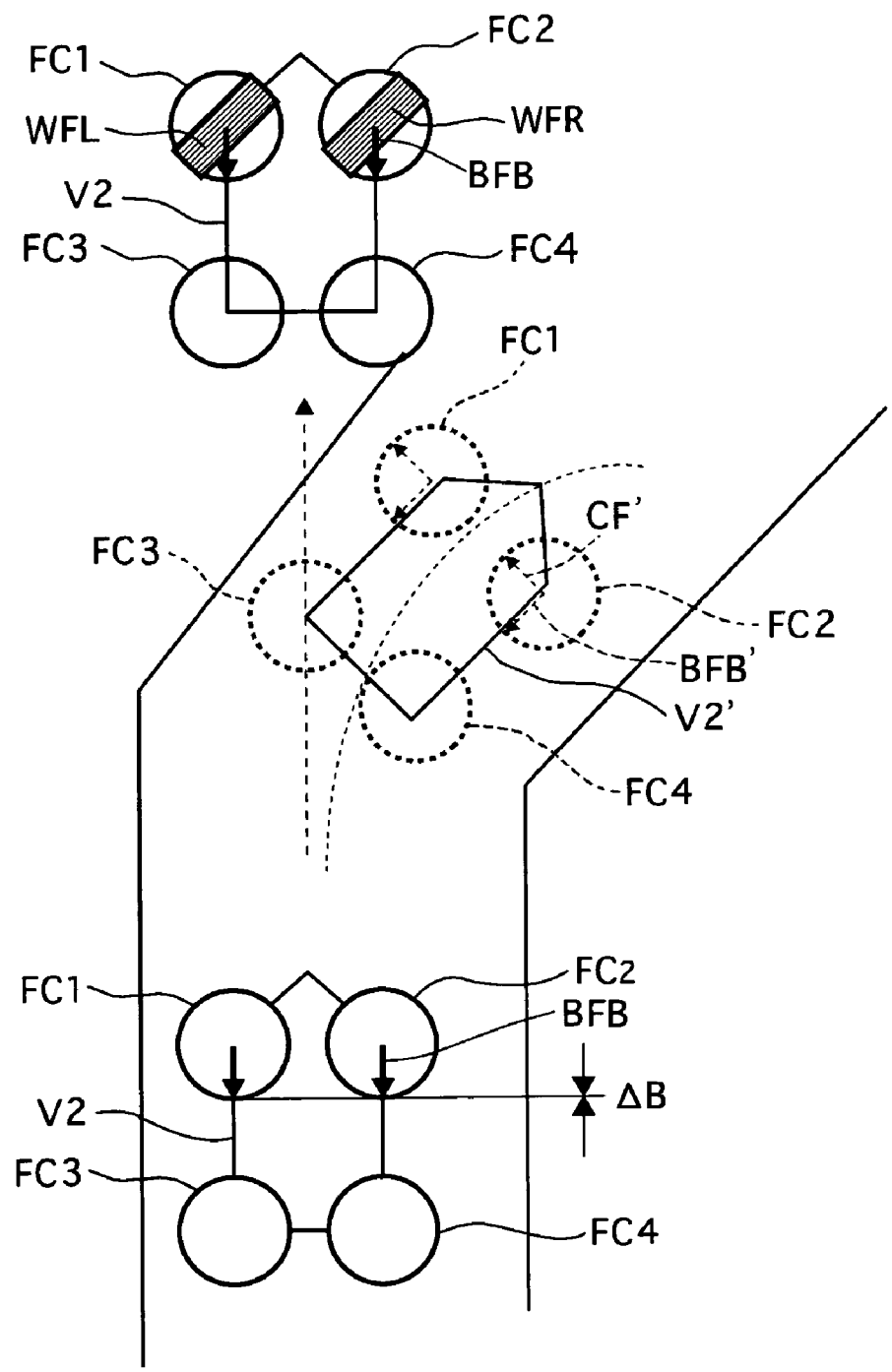
FIG. 20 is a schematic diagram illustrating a state of various forces acting on wheels for the vehicle to understeer during cooperative braking of service brake and regenerative braking.

On the other hand, FIG. 20 shows vehicle behavior in a second case that a vehicle V2, such as the vehicle with the regenerative braking system of the first embodiment, corners and only front wheels are braked by using regenerative braking. In this case, brake force BFB becomes larger than that in the second case, so that it has no margin on a straight road before entering a corner in a case shown in FIG. 20, because the brake force is equal to a radius of a friction circle FC2. This causes no or little cornering force on the front tires regardless of operating a steering wheel, resulting in understeer characteristic of the vehicle V2. In this case, the vehicle V2 deviates from a curve line along which a driver wants to run the vehicle V2 as shown in a upper part of FIG. 20.

In order to ensure cornering of the vehicle V2, the brake force must be set less than the maximum possible brake force BFB' (equal to the radius of the friction circle FC2) to have a margin and produce cornering force at that rate. The brake force and the cornering force are in a relationship with trade off, which means that the maximum cornering force CF' is obtained when the brake force is zero and the maximum brake force BFB' is obtained when the cornering force is zero.

Therefore, in order that the vehicle V2 corners toward a position of a vehicle V2', the brake force must be decreased to secure the cornering force. In the regenerative braking system of the first embodiment, the brake force is optimally decreased as follows.

The regenerative braking system of the first embodiment controls the regenerative braking to reduce the brake force as follows.

The brake controller 5 of the system judges understeer occurrence state due to regenerative braking based on front left and right wheel speed change with a high degree of accuracy and response, and compensates its regenerative braking amount according to the understeer state. This allows the regenerative braking to be used as much as possible, up to the maximum level where it can suppress excessive understeer, resulting in compatibility between improvement in fuel efficiency and improvement in stability and/or operability of the vehicle.

Specifically, as shown in FIG. 5, the demand regenerative torque calculating module 30 calculates demand regenerative torque REGE based on the information on the master cylinder pressure and the brake pedal stroke, and the demand regenerative torque limit calculating part 31 calculates a demand torque maximum limit REGELIM. Then, the demand regenerative torque selecting module 32 selects selected demand regenerative torque REGEMIN based on the demand regenerative torque REGE and the demand torque maximum limit REGELIM by using the select-low principle and calculates final demand regenerative torque TXREGE. This final demand regenerative torque TXREGE is inputted to the integration controller 5, which controls the second motor/generator MG2 to act as a generator so that it applies the final demand regenerative torque TXREGE to the front wheels.

The operation of the demand regenerative torque limit calculating part 31 will be described in detail.

This part 31 calculates an actual front wheel speed variation VWFDIF (=VWFR−VWFL) for calculating an actual cornering amount based on front right wheel speed VWFR and front left wheel speed VWFL. The vehicle body speed calculating module 312 calculates estimated vehicle body speed for calculating an estimated cornering amount by an average wheel speed VWAVE of the rear right wheel speed VWRL and the rear left wheel speed VWRR. The estimated front wheel speed variation calculating module 313 calculates an estimated front wheel speed variation ESTVWFDIF that is estimated to have a value obtained when the vehicle corners with road grip, based on the steering angle STR and the average wheel speed VWAVE. The estimated understeer amount calculating module 314 determines an understeer amount ESTUDSTR based on the estimated front wheel speed variation ESTVWFDIF and the actual front wheel speed variation VWFDIF. Then, the regenerative amount maximum limit calculating module 315 determines a regenerative torque maximum limit REGELIM based on the actual front wheel speed variation VWFDIF and the understeer amount ESTUDRSTR.

Next, a concept of judgment on the understeer state will be described.

When cornering with road grip, outer wheel speed becomes larger than inner wheel speed, since an outer wheel must travel a larger cornering radius of a road than an inner wheel. In addition, an outer-to-inner wheel speed variation between the outer wheel speed and the inner wheel speed becomes lager as the cornering radius becomes smaller and/or as vehicle speed becomes higher.

When the vehicle understeers, its trace deviates outward from a trace at neutralsteer, causing its cornering radius to be larger to approach a straight line. This means that the outer-to-inner wheel speed variation becomes smaller than that of wheels with road grip under the terms of the same cornering radius and the same vehicle speed.

Therefore, an estimated-to-actual wheel speed variation between an estimated front wheel speed variation and an actual front wheel speed variation can be assumed to be an understeer amount of the vehicle, because the understeer amount is determined by how much the vehicle deviates outward from a neutral trace.

Figure 21:
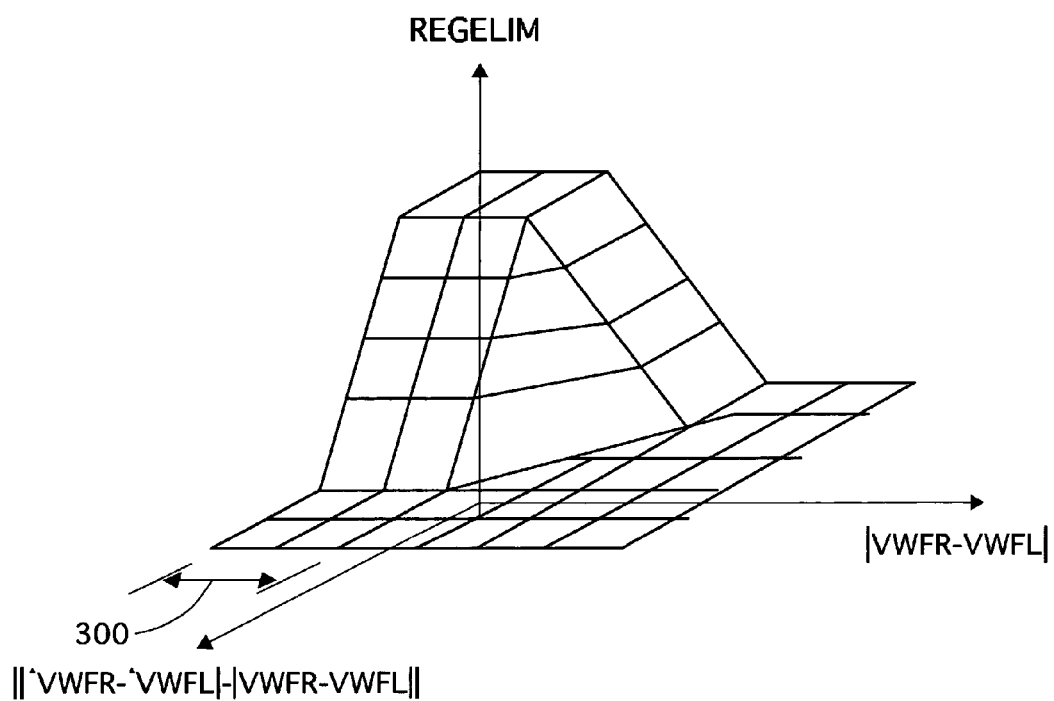
FIG. 21 is a schematic diagram showing a three dimensional map among an understeer amount, a steering amount, and a maximum regenerative torque limit, which is used in the regenerative amount maximum limit calculating module shown in FIG. 11.

On the basis of this concept, in the first embodiment, the understeer amount ESTUDRSTR is, as shown in FIG. 21, obtained from an estimated-to-actual wheel speed variation between an estimated front wheel speed variation |^VWFR−^VWFL| at running with road grip and an actual front wheel speed variation |VWFR−VWFL| at cornering and braking in a understeer state. It is expressed by an equation: ESTUDRSTR=|^VWFR−^VWFL|−|VWFR−VWFL|.

Then, the regenerative braking amount is compensated so that this amount is reduced according to the understeer amount ESTUDRSTR. Specifically, its reduction amount is determined by using the regenerative torque maximum limit REGELIM that becomes lower as the understeer amount ESTUDRSTR becomes larger (as the understeer becomes stronger).

Incidentally, when the estimated-to-actual wheel speed variation, indicated by an arrow 300 in FIG. 21, between the estimated front wheel speed variation |^VWFR−^VWFL| and the actual front wheel speed variation |VWFR−VWFL| is a positive value, the demand regenerative torque limit calculating part 31 judges that the vehicle is in an understeer state, and also judged that its understeer is stronger as a numerical value of the estimated-to-actual wheel speed variation becomes larger. On the other hand, when the estimated-to-actual wheel speed variation is a negative value, the calculating part 31 judges that the vehicle is in an oversteer state, and also judged that the oversteer is stronger as the numerical value of the estimated-to-actual wheel speed variation becomes larger.

Therefore, the calculating part 31 can avoid wrong judgment on the understeer state, since the estimated front wheel speed variation of (|^VWFR−^VWFL|−|VWFR−VWFL|) becomes approximately zero in a case of running with road grip during cornering and regenerative-braking even when the steering angle is large. On the other hand, in a case where the tires of the vehicle lose road-grip, the estimated-to-actual front wheel speed variation of (|^VWFR−^VWFL|−|VWFR−VWFL|) becomes large, and thereby the understeer state is judged.

This judgment can be obtained at an initial state where the vehicle gets into an understeer, because the actual front wheel speed variation changes immediately due to decrease of lateral force generated on the tires. In addition, the judgment can be obtained with accuracy, because the estimated-to-actual front wheel speed variation of (|^VWFR−^VWFL|−|VWFR−VWFL|) becomes larger as the understeer becomes stronger. Accordingly, the calculating part 31 can judge the understeer state with higher accuracy and higher response relative to judgment using yaw rate sensor.

The regenerative braking system of the first embodiment uses the above-described concept of the judgment on the understeer state, which can immediately recover the lateral force of the tires by compensating the regenerative braking amount to be reduced even when a week understeer occurs during cornering and regenerative-braking. In another words, the system can improve fuel efficiency as much as possible by regenerative braking up to the maximum possible range, ensuring to suppress excessive understeer.

Besides, the regenerative braking system of the first embodiment uses the three dimensional maximum torque calculating map mREGELIM, whose parameters are not only the understeer amount ESTUDRSTR (=|^VWFR·1 ^VWFL|−|VWFR·VWFL|), but also the actual front wheel speed variation VWFDIF(=|VWFR−VWFL|) as information on a cornering amount, to determine the maximum regenerative torque limit REGELIM. This ensures the occurrence of understeer, regardless of the steering amount, due to the regenerative braking by decreasing more regenerative braking amount as the steering amount becomes larger, that is, as larger lateral force is required. For example, in a case where the vehicle shows an understeer tendency when the vehicle corners and is braked by the regenerative braking on a very low friction road, its tendency is immediately detected and the regenerative braking amount is reduced, ensuring to suppress the occurrence of understeer.

The regenerative braking system of the first embodiment has the following advantages.

The regenerative braking system of the first embodiment can extend the regenerative braking range up to the maximum possible area where excessive understeer of the vehicle is suppressed, resulting in good compatibility between improvement in fuel efficiency and improvement in stability and controllability of the vehicle.

The system has the actual wheel speed is obtained from an actual wheel speed variation between actual outer wheel speed and actual inner wheel speed of the steerable wheels (the front wheels WFL and WFR in the first embodiment) by using two wheel speed sensor 12 and 13, which provides easy detection of information on the actual wheel speed variation.

The system is provided with the steering sensor 16, and its estimated front wheel speed variation calculating module 313 calculates the estimated front wheel speed variation ESTVW-FDIF, as an estimated front wheel speed variation which corresponds to a front wheel speed variation when the vehicle runs with road grip, based on the estimated vehicle body speed (corresponding to the average wheel speed VWAVE of non-steerable wheels WRL and WRR) and a cornering radius corresponding value (corresponding to the steering angle STR). Therefore, the vehicle body speed can be detected with high accuracy, since it is calculated based on the wheel speed signals outputted from two wheel speed sensors 14 and 15 provided on the non-steerable wheels on which no regenerative brake force acts. In addition, an outer-and-inner wheel speed variation (corresponding to the actual front wheel speed variation in the first embodiment) of the steerable wheels at running with road grip can be also detected with high accuracy by using the estimated vehicle body speed and the steering angle.

In this system, regenerative braking amount to be decreased by compensation is set larger as the understeer amount becomes stronger and the actual wheel speed variation becomes larger, which ensures to suppress excessive understeer due to regenerative braking regardless of the steering amount.

The regenerative braking system is applied to the front wheels of the front engine front drive (F.F.) vehicle, and when an applicable regenerative braking amount is equal to or more than a demand brake amount, only the regenerative braking is used, while, when the applicable regenerative braking amount is less than the demand brake amount, mechanical brake due to brake fluid pressure is added to the regenerative braking. This allows the regenerative energy amount to be recovered as much as possible, providing improvement in fuel economy, and also ensures to suppress the occurrence of excessive understeer by the high responsive compensation to decrease the regenerative braking amount.

Next, a regenerative braking system of a second embodiment according to the present invention will be described with reference to the accompanying drawing of FIG. 22.

This regenerative braking system is equipped with a demand regenerative torque calculating module, a regenerative torque demand limit calculating part, and a demand regenerative torque selecting module.

Figure 22:
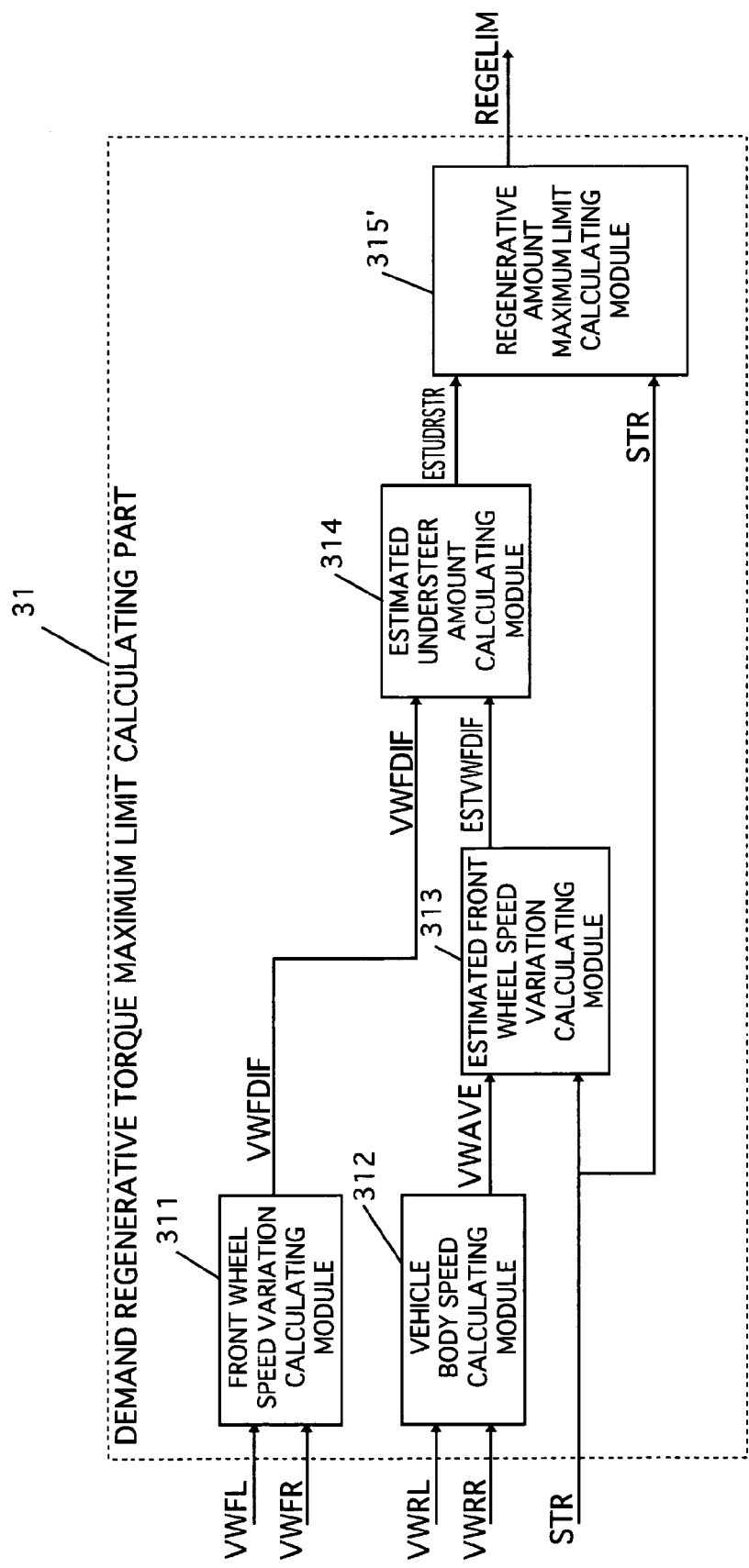
FIG. 22 is a control block diagram of a demand regenerative torque maximum limit calculating part used in a regenerative braking system of a second embodiment according to the present invention.

The demand regenerative torque limit calculating part, as shown in FIG. 22, includes a front wheel speed variation calculating module 311, a vehicle body speed calculating module 312, an estimated front wheel speed variation calculating module 313, an estimated understeer amount calculating module 314, and a regenerative amount maximum limit calculating module 315'.

The front wheel speed variation calculating module 311 is electrically connected to a front left wheel speed sensor and a front right wheel speed sensor, the vehicle body speed calculating module 312 is electrically connected to a rear left wheel speed sensor and a rear right wheel speed sensor, the estimated front wheel speed variation calculating module 313 is electrically connected to the vehicle body speed calculating module 312 and a steering angle sensor, the estimated understeer amount calculating module 314 is electrically connected to the front wheel speed variation calculating module 311 and the estimated front wheel speed variation calculating module 313, and the regenerative amount maximum limit calculating module 315' is electrically connected to the steering angle sensor and the estimated understeer amount calculating module 314.

The regenerative amount maximum limit calculating module 315' is used for determining the regenerative torque maximum limit REGELIM based on a steering angle STR and an understeer amount ESTUDRSTR. The calculating module 315' uses information on the steering angle STR instead of information on the actual front wheel speed variation VWFDIF of the regenerative braking system of the first embodiment, to obtain information on a steering amount.

The other parts are similar to those of the first embodiment shown in FIGS. 1, and 5 to 12.

The operation of the regenerative braking system of the second embodiment will be described.

The regenerative amount maximum limit calculating module 315' determines a regenerative amount maximum limit REGELIM based on a steering angle STR and an understeer amount ESTUDRSTR. The steering angle STR as information on a cornering amount is determined based on driver's will to corner his or her vehicle, and is not affected by a steer characteristic of the vehicle, the actual front wheel speed variation VWFDIF, used in the first embodiment, as the information on the steering amount becomes smaller when the vehicle gets into a tendency of understeer. Accordingly, the system of the second embodiment can obtain high accurate information on the steering amount. The other operations are similar to those of the first embodiment.

The regenerative braking system of the second embodiment has the following advantages.

This system has advantages in good compatibility between improvement in fuel efficiency and improvement in stability and controllability of the vehicle, easy detection of information on an actual wheel speed variation, and high accurate detection of an outer-and-inner wheel speed variation of steerable wheels at running with road grip. Besides, in the second embodiment, the system is provided with the steering angle sensor 16, and compensates the regenerative braking amount to be decreased according to as understeer becomes stronger and the steering angle becomes larger, which ensures to suppress the occurrence of excessive understeer due to the regenerative braking regardless of the steering amount.

Next, a regenerative braking system of a third embodiment according to the present invention will be described with reference to the accompanying drawings of FIGS. 23 and 24.

The regenerative braking system of the third embodiment is equipped with a demand regenerative torque calculating module, a demand regenerative torque maximum limit calculating part 31, and a demand regenerative torque selecting module.

Figure 23:
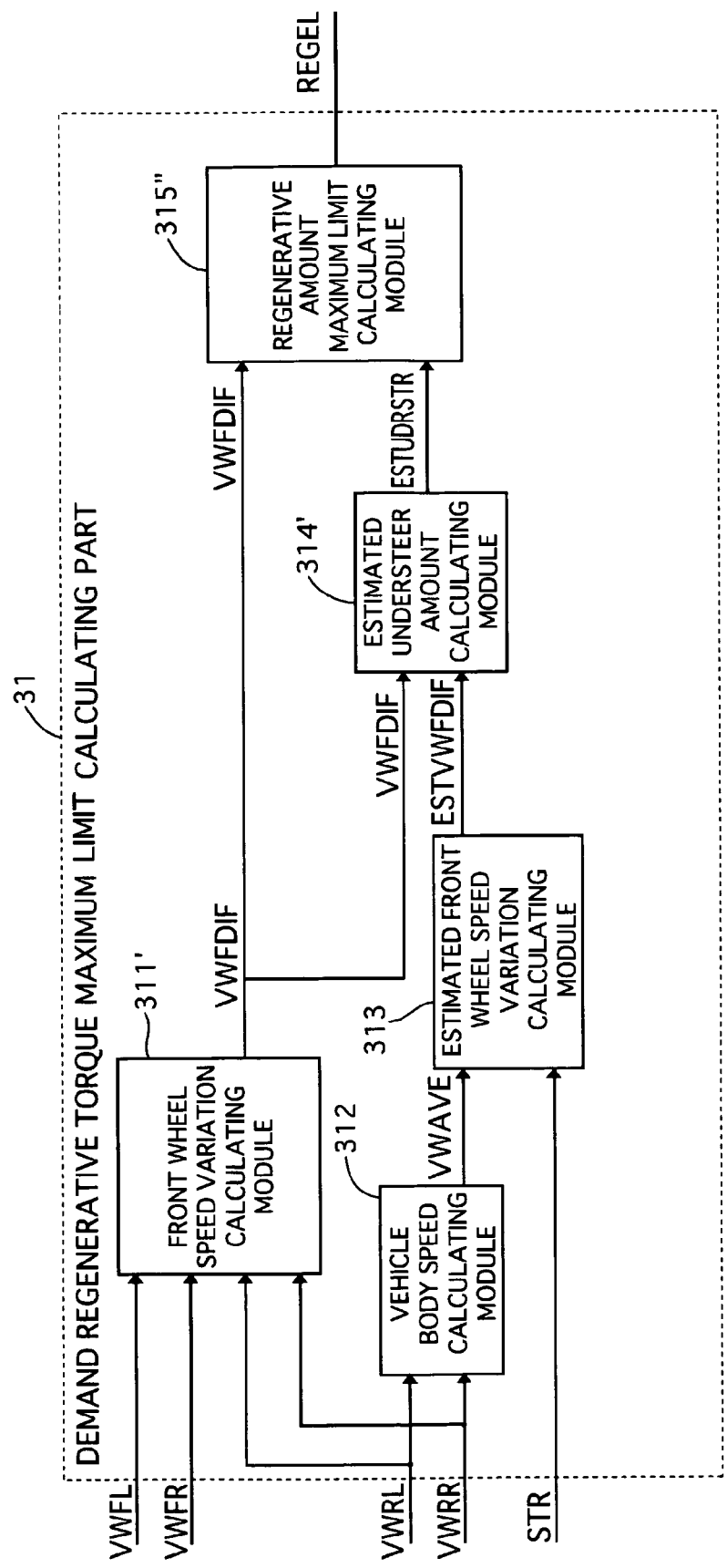
FIG. 23 is a control block diagram of a demand regenerative torque maximum limit calculating part used in a regenerative braking system of a third embodiment according to the present invention.
Figure 24:
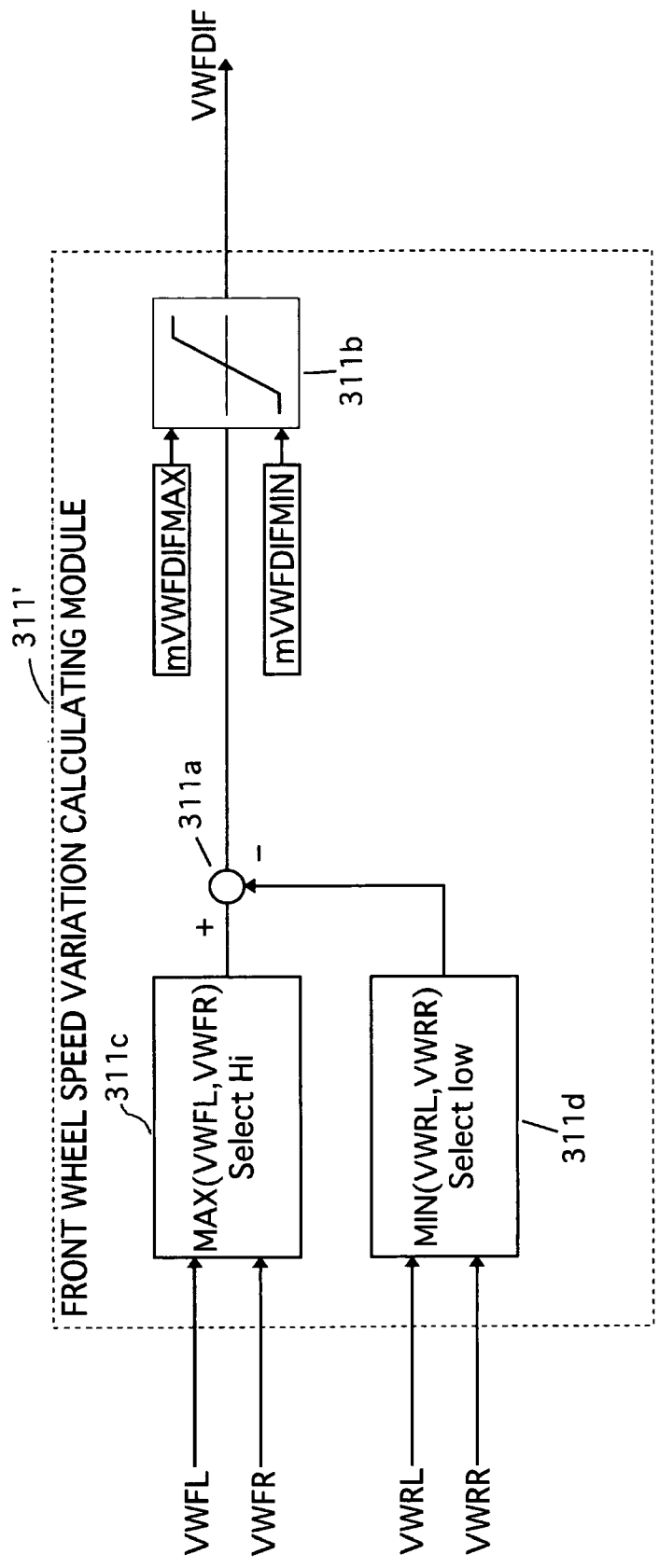
FIG. 24 is a control block diagram of a front wheel speed variation calculating module used in the regenerative braking system of the third embodiment.

The demand regenerative torque maximum limit calculating part 31 is, as shown in FIG. 23, provided with a front wheel speed variation calculating module 311', a vehicle body speed calculating module 312, an estimated front wheel speed variation calculating module 313, an estimated understeer amount calculating module 314', and a regenerative amount maximum limit calculating module 315".

The front wheel speed variation calculating module 311' is used for obtaining an actual front wheel speed variation VWFDIF as actual steering amount information. The calculating module 311' includes a front outer wheel speed setting part 311c, a front inner wheel speed setting part 311d, a subtracter 311a, and a limiter 311b, as shown in FIG. 24.

The front outer wheel speed setting part 311c is electrically connected to a front left wheel speed sensor and a front right wheel speed sensor to receive information on front left wheel speed VWFL and front right wheel speed VWFR, and selects higher front wheel speed from front left wheel speed VWFL and front right wheel speed VWFR by using select-high principle to output it.

The front inner wheel speed setting part 311d is electrically connected to a rear left wheel speed sensor and a front right wheel speed sensor to receive information on front left wheel speed VWRL and rear right wheel speed VWRR, and selects lower rear wheel speed from rear left wheel speed VWRL and rear right wheel speed VWRR by using select-low principle to output it.

The subtracter 311a is electrically connected to the front outer wheel speed setting part 311c and the front inner wheel speed setting part 311d to receive information on the higher front wheel speed and the lower rear wheel speed, and calculates an actual higher-to-lower wheel speed variation by subtracting the lower rear wheel speed from the higher front wheel speed.

The limiter 311b is electrically connected to the subtracter 311a to receive the actual higher-to-lower wheel speed variation, and calculates an actual front wheel speed variation VWFDIF by using a filter with the maximum front wheel speed variation mVWFDIFMAX and the minimum front wheel speed variation mVWFDIFMIN.

The estimated understeer amount calculating module 314' determines an understeer amount ESTUDRSTR based on an estimated-to-actual front wheel speed variation between an estimated front wheel speed variation ESTVWFDIF and an actual front wheel speed variation VWFDIF The regenerative amount maximum limit calculating module 315" determines a regenerative torque maximum limit REGELIM based on the actual front wheel speed variation VWFDIF and the understeer amount ESTUDRSTR.

The other parts are similar to those of the first embodiment.

The operation of the regenerative braking system of the second embodiment will be described.

The front wheel speed variation calculating module 311' calculates the actual front wheel speed variation VWFDIF, which is used for calculating the actual steering amount, based on the higher front wheel speed and the lower rear wheel speed.

Note that the lower rear wheel speed is almost equal to the front inner wheel speed at running with road grip, since the rear wheels are free from lock due to braking. Accordingly, the actual front wheel speed variation VWFDIF as the actual steering amount information is not affected by braking lock, which easily occurs when cornering and braking on a very low friction road. Therefore, the system can obtain the actual front wheel speed variation VWFDIF, the understeer amount ESTUDRSTR, and the regenerative torque maximum limit REGELIM with high accuracy.

The other operations are similar to those of the first embodiment.

The regenerative braking system of the third embodiment has the following advantages.

This system has advantages in good compatibility between improvement in fuel efficiency and improvement in stability and controllability of the vehicle, high accurate detection of an outer-and-inner wheel speed variation of steerable wheels at running with road grip, and regenerative energy recovery as much as possible.

Besides, the system calculates the actual outer-to-inner wheel speed variation between actual outer wheel speed of a steerable wheel (a front wheel in the third embodiment) and actual inner wheel speed of a non-steerable wheel (a rear wheel in the third embodiment), and can obtain accurate information on the actual steering amount which is free from braking lock.

Note that, in the first to third embodiments, "excessive understeer" is more than approximately neutralsteer in an understeer direction and its value is set according to vehicle characters that car designer determines.

While the invention has been particularly shown and described with reference to preferred embodiments thereof, it will be understood by those skilled in the art that the foregoing and other changes in form and details can be made therein without departing from the spirit and scope of the invention.

For example, the regenerative braking system of the present invention can be applied to not only hybrid electric vehicles, but also electric vehicles with two-wheel drive and four-wheel drive, four-wheel steering vehicles with a generator for regenerative braking, and the like.

The estimated road-grip correspondent wheel speed variation is obtained based on the estimated vehicle body speed and the cornering radius corresponding value, where the estimated vehicle body speed is obtained from the average wheel speed of the non-steerable wheels and the cornering radius corresponding value is obtained from the steering angle in the first to third embodiments, but as long as the estimated road-grip correspondent wheel speed variation is obtained based on a value corresponding to a variation between the outer wheel speed and the inner wheel speed of the steerable tire with road grip, the vehicle body speed may be obtained by using a back-and-forth directional acceleration sensor or a vehicle-body-speed estimation method of an A.B.S. system, and the cornering radius corresponding value may be obtained by using a lateral directional acceleration sensor.

The regenerative braking system is applied to the front wheels in the first to third embodiment, which is most desirable, because vehicles dives frontward at its braking, causing load transfer toward the front tires, and thereby the system can recover more regenerative energy at that rate. But, the application of the system is not limited to the front wheels, and it may be applied to rear wheels to suppress excessive oversteer.

The entire contents of Japanese Patent Application No. 2004-264059 filed Sep. 10, 2004 is incorporated herein by reference.

What is claimed is:

1. A regenerative braking system comprising:
a generator that is connected with a wheel set, the generator being capable of applying regenerative brake torque to the wheel set by generating electricity;
a regenerative braking control means that controls a regenerative braking amount of the generator based on at least a demand brake force amount;
an actual wheel speed variation calculating means that calculates an actual wheel speed variation between an actual outer wheel speed of an outer wheel of steerable wheels and an actual inner wheel speed of at least one wheel of a front wheel set and a rear wheel set;
an estimated road-grip correspondent wheel speed variation calculating means that estimates an estimated road-grip correspondent wheel speed variation corresponding to an outer-to-inner wheel speed variation between outer wheel speed and inner wheel speed of the steerable wheels with road grip;
a steer characteristic judging means that judges that an estimated understeer amount of a steer characteristic becomes stronger as a numerical value of an estimated-to-actual wheel speed variation between the estimated road-grip correspondent wheel speed variation and the actual wheel speed variation becomes larger; and a regenerative braking amount compensating means that compensates the regenerative braking amount so that the regenerative braking amount decreases more as the estimated understeer amount becomes stronger.

2. The regenerative braking system according to claim 1, wherein the actual wheel speed variation calculating means calculates the actual wheel speed variation based on the actual outer wheel speed and the actual inner wheel speed of the steerable wheels.

3. The regenerative braking system according to claim 1, further comprising:

a steering angle sensor that detects a steering angle, wherein the estimated road-grip correspondent wheel speed variation calculating means calculates the estimated road-grip correspondent wheel speed variation based on an estimated vehicle body speed obtained from an average wheel speed of non-steerable wheels and based on a cornering radius corresponding value obtained from a steering angle.

4. The regenerative braking system according to claim 1, wherein the regenerative braking amount compensating means compensates the regenerative braking amount such that the regenerative braking amount is decreased more as the estimated understeer amount becomes stronger and the actual wheel speed variation becomes larger.

5. The regenerative braking system according to claim 1, further comprising:

a steering angle sensor that detects a steering angle, wherein the regenerative braking amount compensating means compensates the regenerative braking amount such that the regenerative braking amount is decreased more as the estimated understeer amount becomes stronger and the steering angle becomes larger.

6. The regenerative braking system according to claim 1, wherein the actual wheel speed variation calculating means calculates the actual wheel speed variation between the actual outer wheel speed of the outer wheel of the steerable wheels and the actual inner wheel speed of an inner wheel of non-steerable wheels.

7. The regenerative braking system according to claim 1, wherein the front wheel set is the wheel set connected with the generator and the steerable wheels and capable of being driven, and wherein the regenerative braking control means controls the generator such that only regenerative braking is applied to the front wheel set when the demand brake force amount is no more than the regenerative braking amount and that the regenerative braking and mechanical braking are cooperatively applied to the front wheel set when the demand brake force amount is more that the regenerative braking amount.

8. The regenerative braking system according to claim 1, wherein the steer characteristic judging means is provided with an understeer amount calculating map for determining the estimated understeer amount based on the estimated-to-actual wheel speed variation.

9. The regenerative braking system according to claim 1, wherein the estimated road-grip correspondent wheel speed variation calculating means is provided with an estimated wheel speed variation map which has data among a steering angle, an average rear wheel speed and the estimated road-grip correspondent wheel speed variation.

10. The regenerative braking system according to claim 1, wherein the regenerative braking amount compensating means is provided with a maximum torque calculating table which has data on the actual wheel speed variation, the estimated understeer amount and a regenerating torque maximum limit to limit a maximum value of regenerating torque.

11. A regenerative braking system for a motor vehicle comprising:

a generator that is connected with a wheel set, the generator being capable of applying regenerative brake torque to the wheel set by generating electricity;

a regenerative braking controller that controls a regenerative braking amount of the generator based on at least a demand brake force amount;

an actual wheel speed variation calculating module that calculates an actual wheel speed variation between an actual outer wheel speed of an outer wheel of steerable wheels and an actual inner wheel speed of at least one wheel of a front wheel set and a rear wheel set;

an estimated road-grip correspondent wheel speed variation calculating module that estimates an estimated road-grip correspondent wheel speed variation corresponding to an outer-to-inner wheel speed variation between outer wheel speed and inner wheel speed of the steerable wheels with road grip;

a steer characteristic judging module that judges that an estimated understeer amount of a steer characteristic becomes stronger as a numerical value of an estimated-to-actual wheel speed variation between the estimated road-grip correspondent wheel speed variation and the actual wheel speed variation becomes larger; and a regenerative braking amount compensating module that compensates the regenerative braking amount so that the regenerative braking amount decreases more as the estimated understeer amount becomes stronger.

* * * * *